United States Patent
Jeong

(10) Patent No.: US 8,271,021 B2
(45) Date of Patent: Sep. 18, 2012

(54) MOBILE TERMINAL AND METHOD OF PERFORMING FUNCTIONS USING THE SAME

(75) Inventor: Woo Young Jeong, Seoul (KR)

(73) Assignee: LG Electronics Inc., Seoul (KR)

( * ) Notice: Subject to any disclaimer, the term of this patent is extended or adjusted under 35 U.S.C. 154(b) by 395 days.

(21) Appl. No.: 12/543,883

(22) Filed: Aug. 19, 2009

(65) Prior Publication Data
US 2010/0323671 A1 Dec. 23, 2010

(30) Foreign Application Priority Data

Jun. 19, 2009 (KR) ........................ 10-2009-0054816

(51) Int. Cl.
*H04M 1/00* (2006.01)
*G06K 9/00* (2006.01)
(52) U.S. Cl. ..................... 455/550.1; 382/100
(58) Field of Classification Search .................. 348/180, 348/231.99, 744, 372; 345/589, 690; 705/27; 382/100; 707/10; 455/456.2, 66.1, 550.1, 455/414.1; 358/1.15, 1.9, 520, 504, 523, 358/407
See application file for complete search history.

(56) References Cited

U.S. PATENT DOCUMENTS

| 6,157,454 A | 12/2000 | Wagner et al. |
| 2002/0159065 A1 | 10/2002 | Berstis |
| 2007/0124304 A1 * | 5/2007 | Dimitrova et al. ............. 707/10 |
| 2009/0160878 A1 * | 6/2009 | Kwong et al. ................. 345/690 |
| 2009/0252371 A1 * | 10/2009 | Rao ............................... 382/100 |

FOREIGN PATENT DOCUMENTS

| JP | 2005-236470 A | 9/2005 |
| WO | WO 2008/060580 A2 | 5/2008 |
| WO | WO 2008/060580 A3 | 5/2008 |

OTHER PUBLICATIONS

Alex Chitu: "Google Image Search Color Filter", XP002595206, Apr. 8, 2009, Retrieved from Internet: URL:http://googlesystem.blogspot.com/2009/04/google-image-search-color-filter.html.
Michael Huber: "Multicolr Search Durchsucht Flickr nach Farben", XP00259293, Dec. 3, 2008, pp. 1-3, retrieved from Internet: URL:http://michael.mind-exchange.com/multicolr-search-durchsucht-flickr-nach-farben-1288.
Simovic, "Farbpicker der Nachsten Generation", Tools for the Web, May 29, 2009, one (1) page, XP002609369.
Park, "Color Picker", CLDFX, http://www.cldfx.com/2009/06/color-picker-by-jinsun-park (published online Jun. 5, 2009), XP055024614.
Park, "Color Picker", Project 05, http://www.project05.com/2009/02/color-picker-by-park-jinsun (published online Feb. 11, 2009), XP055024613.

* cited by examiner

*Primary Examiner* — Kiet Doan
(74) *Attorney, Agent, or Firm* — Birch, Stewart, Kolasch & Birch, LLP

(57) ABSTRACT

A mobile terminal and a method of performing functions using the mobile terminal are provided. The mobile terminal performs various functions using color information acquired through a color sensor, and the method performs functions using the mobile terminal.

8 Claims, 31 Drawing Sheets

| Color | Function |
|---|---|
| RED | Drive web browser |
| BLACK | Set lock mode |
| WHITE | Release lock mode |
| BLUE | Enter phonebook |
| ⋮ | ⋮ |

81 → RED
82 → BLACK
83 → WHITE
84 → BLUE

FIG. 20

| Color | Phonebook |
|---|---|
| GREEN | James |
| RED | Ann |
| BLACK | Kevin |
| WHITE+BLACK | 010-1111-2222 |
| ⋮ | ⋮ |

85 → GREEN
86 → RED
87 → BLACK
88 → WHITE+BLACK

MOBILE TERMINAL AND METHOD OF PERFORMING FUNCTIONS USING THE SAME

The present application claims priority to Korean Application No. 10-2009-0054816 filed in Korea on Jun. 19, 2009, the entire contents of which is hereby incorporated by reference in its entirety.

BACKGROUND OF THE INVENTION

1. Field of the Invention

The present invention relates to a mobile terminal, and more particularly, to a mobile terminal that performs various functions using color information acquired through a color sensor, and a method of performing functions using the mobile terminal.

2. Discussion of the Related Art

In general, there is a limitation on a size of a mobile terminal to ensure mobility and portability. Such size limitations lead to a size limitation of the terminal's input means and display means, that causes the user's inconvenience.

Accordingly, many efforts have been made to ensure mobility and portability of the mobile terminal and reduce the user's inconvenience. Mostly, such efforts are made to simplify inputting of information and performance of functions and improve convenience.

SUMMARY OF THE INVENTION

One object of the present invention is to provide a mobile terminal that performs various functions using color information acquired through a color sensor, and a method of performing functions using the mobile terminal.

Another object of the present invention is to provide a mobile terminal that can use a color sensor as an input means, and a method of performing functions using the mobile terminal.

A further object of the present invention is to provide a mobile terminal that can complement performance of functions provided thereby, using color information acquired through a color sensor, when performing the functions, and a method of performing functions using the mobile terminal.

A still further object of the present invention is to provide a mobile terminal that can easily and rapidly perform functions provided thereby, using color information acquired through a color sensor, and a method of performing functions using the mobile terminal.

According to a first aspect of the present invention, there is a mobile terminal that includes: a communication unit configured to provide an Internet access function; a color sensor configured to sense color information of an external object; and a controller configured to transmit the color information transferred from the color sensor to a website that provides a search function so as to perform the search function, in a state where the controller accesses the website through the communication unit.

According to a second aspect of the present invention, there is a mobile terminal that includes: a display unit; a memory configured to store one or more applications; a color sensor configured to sense color information of an external object; and a controller configured to change a graphical object provided to the display unit by the activated application among the one or more applications, based on the color information transferred from the color sensor.

According to a third aspect of the present invention, there is a mobile terminal that includes: a color sensor configured to sense color information of an external object; and a controller configured to perform a function corresponding to predetermined color information, when receiving the predetermined color information from the color sensor.

According to a fourth aspect of the present invention, there is a mobile terminal that includes: a display unit; a color sensor configured to sense color information of an external object; and a controller configured to provide the display unit with plural pieces of color information transferred from the color sensor, and store one or more selected pieces of color information in a color information database, when the one or more pieces of color information are selected from the plural provided pieces of color information.

According to a fifth aspect of the present invention, there is a method of performing functions using a mobile terminal that includes: accessing a website that provides a search function; sensing color information of an external object using a color sensor; and transmitting the sensed color information to the website so as to perform the search function.

According to a sixth aspect of the present invention, there is a method of performing functions using a mobile terminal that includes: activating an application; sensing color information of an external object using the color sensor; and changing a graphical object provided by the activated application, based on the sensed color information.

The mobile terminal and the method of performing the functions using the mobile terminal according to the present invention have the following effects.

According to an aspect of the present invention, the mobile terminal can use the color sensor as new input means.

In addition, according to an aspect of the present invention, the mobile terminal can complement performance of the functions provided thereby, using the color information acquired through the color sensor, when performing the functions.

Moreover, according to an aspect of the present invention, the mobile terminal can easily and rapidly perform the functions provided thereby, using the color information acquired through the color sensor.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain principles of the invention. In the drawings:

FIGS. 18 to 20 are diagrams used to explain the method of performing the functions using the mobile terminal according to the third embodiment of the present invention.

DETAILED DESCRIPTION OF PREFERRED EMBODIMENTS

Figure 1:
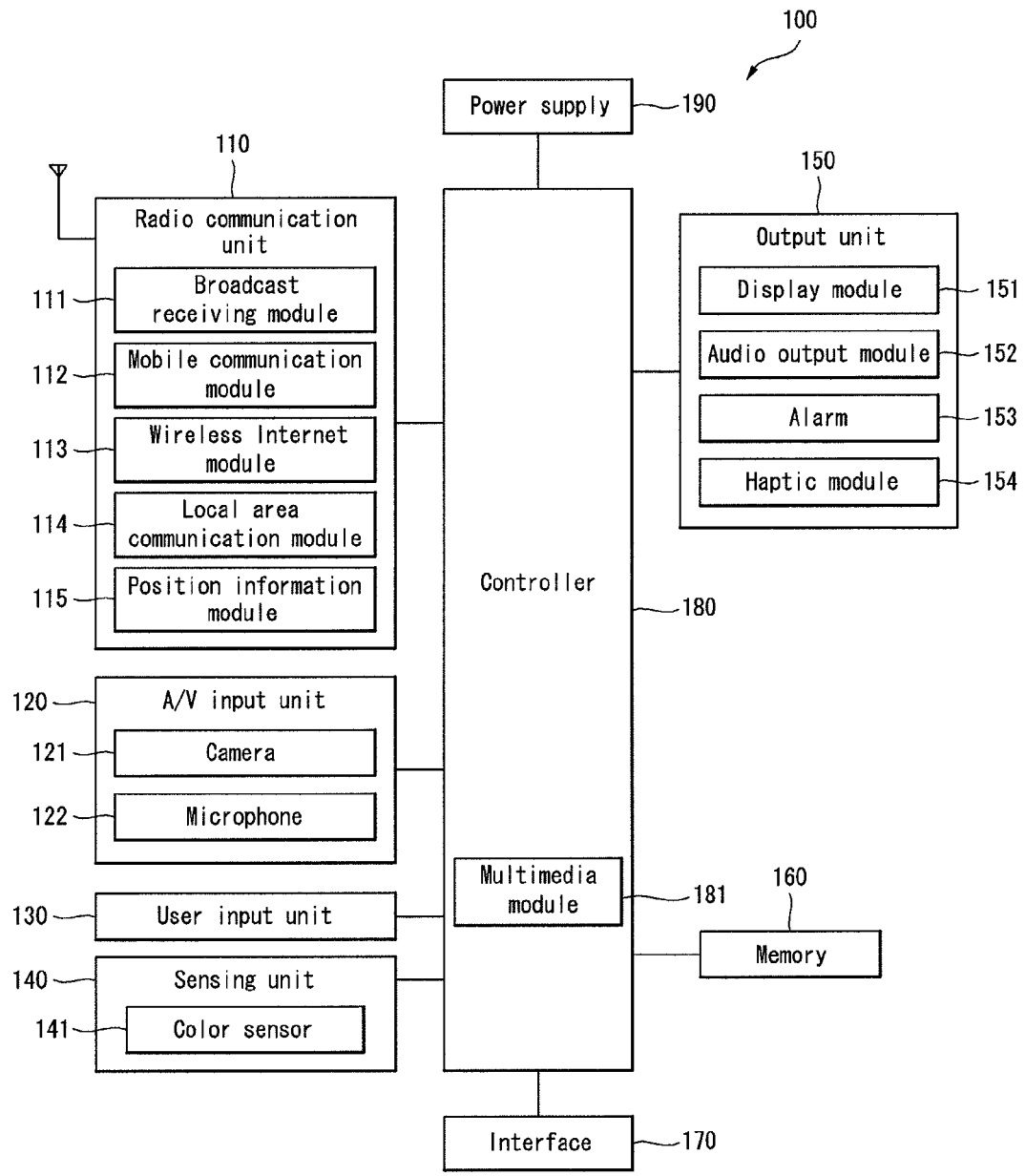
FIG. 1 is a block diagram of a mobile terminal according to an embodiment of the present invention.

The above and other aspects, features and advantages of the present invention will become apparent from the following description given in conjunction with the accompanying drawings. Hereinafter, preferred embodiments of the present invention will be described in detail with reference to the accompanying drawings. Throughout the drawings and description, the same elements are denoted by the same reference numerals. Also, well-known functions or constructions are not described in detail since such description would detract from the clarity and concision of the disclosure of the invention.

Hereinafter, a mobile terminal according to the present invention will be described in detail with reference to the drawings. The terms 'module' and 'unit' are used to conveniently denote components in the following description, however these terms do not have special meanings or distinguishing roles.

The mobile terminal explained in this description may be a cellular phone, smart phone, laptop computer, digital broadcasting terminal, personal digital assistant (PDA), portable multimedia player (PMP), navigator, and so on.

FIG. 1 is a block diagram of a mobile terminal according to an embodiment of the present invention.

The mobile terminal 100 may include a radio communication unit 110, an audio/video (A/V) input unit 120, a user input unit 130, a sensing unit 140, an output unit 150, a memory 160, an interface 170, a controller 180, and a power supply 190. Not all of the components shown in FIG. 1 are essential, and it is possible to implement a mobile terminal with more or fewer components.

Hereinafter, the components will be described one by one.

The radio communication unit 110 may include at least one module that enables radio communication between the mobile terminal 100 and a radio communication system or between the mobile terminal 100 and a network in which the mobile terminal 100 is located. For example, the radio communication unit 110 may include a broadcast receiving module 111, a mobile communication module 112, a wireless Internet module 113, a local area communication module 114 and a position information module 115.

The broadcast receiving module 111 receives broadcast signals and/or broadcast-related information from an external broadcast management server through a broadcasting channel.

The broadcasting channel may include a satellite channel and a terrestrial channel. The broadcast management server may generate and transmit broadcast signals and/or broadcast-related information, or receive previously created broadcast signals and/or broadcast-related information and transmit the broadcast signals and/or broadcast-related information to a terminal. The broadcast signals may include not only TV broadcast signals, radio broadcast signals and data broadcast signals, but also signals in the form of some combination of a TV broadcast signal or a radio broadcast signal and a data broadcast signal.

The broadcast-related information may be information on a broadcasting channel, a broadcast program or a broadcasting service provider, and may be provided even through a mobile communication network. In the latter case, the broadcast-related information can be received by the mobile communication module 112.

The broadcast-related information may exist in various forms. For example, the broadcast-related information may exist in the form of an electronic program guide (EPG) of the digital multimedia broadcasting (DMB) system or an electronic service guide (ESG) of the digital video broadcast-handheld (DVB-H) system.

The broadcast receiving module 111 receives broadcast signals using various broadcasting systems. Particularly, the broadcast receiving module 111 can receive digital broadcast signals using digital broadcasting systems such as the digital multimedia broadcasting-terrestrial (DMB-T) system, the digital multimedia broadcasting-satellite (DMB-S) system, the media forward link only (MediaFLO) system, the DVB-H and integrated services digital broadcast-terrestrial (ISDB-T) system, etc. The broadcast receiving module 111 can also be constructed to be suited to broadcasting systems providing broadcast signals other than the above-described digital broadcasting systems.

The broadcast signals and/or broadcast-related information received through the broadcast receiving module 111 can be stored in the memory 160.

The mobile communication module 112 transmits/receives a radio signal to/from at least one of a base station, an external terminal and a server in a mobile communication network. The radio signal may include a voice call signal, a video telephony call signal or data in various forms according to transmission and reception of text/multimedia messages.

The wireless Internet module 113 corresponds to a module for wireless Internet access and may be included in the mobile terminal 100 or externally attached to the mobile terminal 100. A wireless LAN (WLAN) (Wi-Fi), wireless broadband (Wibro), world interoperability for microwave access (Wimax), high speed downlink packet access (HSDPA) and so on can be used as a wireless Internet technique.

The local area communication module 114 corresponds to a module for local area communication. Bluetooth, radio frequency identification (RFID), infrared data association (IrDA), ultra wideband (UWB) and ZigBee can be used as a local area communication technique.

The position information module 115 confirms or obtains the position of the mobile terminal. The position information module 115 can acquire position information using a global navigation satellite system (GNSS). Here, GNSS refers to radio navigation satellite systems that orbit the earth and transmit reference signals so that the location of certain types of radio navigation receivers on the earth's surface can be determined or approximated. GNSS includes a global positioning system (GPS) managed by the USA, Galileo managed by Europe, global orbiting navigational satellite system (GLONASS) managed by Russia, COMPASS managed by China, and quasi-zenith satellite system (QZSS) managed by Japan.

As one representative example of GNSS, the position information module 115 may be a GPS module. The GPS module 115 can calculate information on distances between one point (object) and at least three satellites, information on the time when the distance information is measured, and use the obtained distance information to triangulate three-dimensional position information on the point (object) according to latitude, longitude and altitude at a predetermined time. Moreover, a method of calculating position and time information using three satellites and correcting the calculated position and time information using another satellite can also be used. In addition, the GPS module 115 continuously calculates the current position in real time and calculates velocity information using the position information.

Referring to FIG. 1, the A/V input unit 120 is used to input an audio signal or a video signal and includes a camera 121 and a microphone 122. The camera 121 processes image frames of still images or moving images obtained by an image sensor in a video telephony mode or a photography mode. Further, the processed image frames can be displayed on a display unit 151.

The image frames processed by the camera 121 can be stored in the memory 160 or transmitted to an external device through the radio communication unit 110. The mobile terminal 100 may include at least two cameras.

The microphone 122 receives an external audio signal in a call mode, a recording mode or a speech recognition mode and processes the received audio signal into electric audio data. The processed audio data can then be converted into a form that can be transmitted to a mobile communication base station through the mobile communication module 112 and output in the call mode. Further, the microphone 122 can employ various noise removal algorithms for removing noise generated when the external audio signal is received.

The user input unit 130 generates input data for controlling the operation of the terminal from a user. The user input unit 130 may include a keypad, a dome switch, a touch pad (constant voltage/capacitance), jog wheel, jog switch and so on.

The sensing unit 140 senses the current state of the mobile terminal 100, such as an open/closed state of the mobile terminal 100, the position of the mobile terminal 100, whether the user touches the mobile terminal 100, the direction of the mobile terminal 100 and the acceleration/deceleration of the mobile terminal 100, and generates a sensing signal for controlling the operation of the mobile terminal 100. For example, the sensing unit 140 can sense whether a slide phone is opened or closed when the mobile terminal 100 is the slide phone. In addition, the sensing unit 140 can sense whether the power supply 190 supplies power and whether the interface 170 is connected to an external device. Meanwhile, the sensing unit 140 may include a proximity sensor.

Particularly, the sensing unit 140 may include a color sensor 141. The color sensor 141 acquires color information of a peripheral or external object. For example, the color sensor 141 may sense color information of a specific object located outside the mobile terminal 100, and transfer the sensed value to the controller 180 as an analog or digital value.

A method of acquiring color information using the color sensor 141 may be implemented in various ways. For example, the color sensor 141 may sense frequency differences or color temperature differences of colors to acquire color information.

The color sensor 141 may identify red, green and blue, which are three primary colors of light, and transfer their quantities to the controller 180. The controller 180 can acquire final color information using the values transferred from the color sensor 141.

In addition, the color sensor 141 may acquire the final color information by itself, and then transfer the final color information to the controller 180.

Moreover, the color sensor 141 may measure an ambient light quantity.

The output unit 150 generates visual, auditory and/or tactile output and may include the display unit 151, an audio output module 152, an alarm 153 and a haptic module 154.

The display unit 151 displays information processed by the mobile terminal 100. For example, the display unit 151 displays a user interface (UI) or graphic user interface (GUI) related to a telephone call when the mobile terminal is in the call mode. The display unit 151 also displays a captured and/or received image, UI or GUI when the mobile terminal 100 is in the video telephony mode or the photography mode.

The display unit 151 may include at least one of a liquid crystal display, a thin film transistor liquid crystal display, an organic light-emitting diode display, a flexible display and a three-dimensional display.

Some of these displays may be of a transparent type or a light transmission type so that the user can see the outside through the display. It can be called a transparent display. One representative example of the transparent display is a transparent liquid crystal display (LCD). The rear structure of the display unit 151 may be of the light transmission type. Accordingly, the user can see an object located behind the body of the mobile terminal 100 through the transparent area of the body of the mobile terminal 100, that is occupied by the display unit 151.

The mobile terminal 100 may include two or more display units 151. For example, the mobile terminal 100 may include a plurality of display units that are arranged on a single face separately or integrally. The plurality of display units may be arranged on different sides.

When the display unit 151 and a sensor sensing touch (hereinafter, referred to as a touch sensor) form a layered structure, hereinafter referred to as a touch screen, the display unit 151 may be used as an input device in addition to an output device. The touch sensor can be in the form of a touch film, a touch sheet and a touch pad, for example.

The touch sensor may be constructed to convert a variation in pressure applied to a specific portion of the display unit 151 or a variation in capacitance generated at a specific portion of the display unit 151 into an electric input signal. The touch sensor may also be constructed to sense pressure of touch as well as the position and area of the touch.

When the user applies touch input to the touch sensor, a signal(s) corresponding to the touch input is transmitted to a touch controller. The touch controller then processes the signal(s) and transmits data corresponding to the processed signal(s) to the controller 180. Accordingly, the controller 180 can detect a touched portion of the display unit 151.

Referring to FIG. 1, the proximity sensor may be located in an internal region of the mobile terminal, surrounded by the touch screen, or near the touch screen. The proximity sensor senses an object approaching a predetermined sensing face or an object located near the proximity sensor using an electromagnetic field or infrared rays without mechanical contact. Further, the proximity sensor has a longer lifespan than a contact sensor and thus has wide-ranging applications.

The proximity sensor includes a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc.

A capacitive touch screen is constructed such that proximity of a pointer is detected through a variation in an electric field according to the proximity of the pointer. In this instance, the touch screen (touch sensor) can be classified as a proximity sensor.

For convenience of explanation, the action of the pointer approaching the touch screen without actually touching the touch screen is referred to as "proximity touch" and an action of bringing the pointer into contact with the touch screen is referred to as "contact touch" in the following description. The proximity touch position of the pointer on the touch screen is equivalent to a position of the pointer orthogonal to the touch screen when the pointer proximity-touches the touch screen.

The proximity sensor senses the proximity touch and a proximity touch pattern (for example, a proximity touch distance, a proximity touch direction, a proximity touch velocity, a proximity touch time, a proximity touch position, a proximity touch moving state, etc.) Information corresponding to the sensed proximity touch action and proximity touch pattern can then be displayed on the touch screen.

The audio output module 152 can output audio data received from the radio communication unit 110 or stored in the memory 160 in a call signal receiving mode, a telephone call mode or a recording mode, a speech recognition mode and a broadcast receiving mode. Further, the audio output module 152 outputs audio signals related to functions (for example, a call signal incoming tone, a message incoming tone, etc.) performed in the mobile terminal 100. The audio output module 152 may include a receiver, a speaker, a buzzer, etc. Furthermore, the audio output module 152 can output sound through an earphone jack 116. The user can connect earphones to the earphone jack 116 and hear the output sound.

In addition, the alarm 153 outputs a signal for indicating generation of an event of the mobile terminal 100. For example, events generated in the mobile terminal 100 include receiving a call signal, receiving a message, inputting a key signal, inputting touch, etc. The alarm 153 can also output signals in forms different from video signals or audio signals, for example, a signal for indicating generation of an event through vibration. The video signals or the audio signals can be also output through the display unit 151 or the audio output module 152.

The haptic module 154 generates various haptic effects that the user can feel. One representative example of the haptic effects generated by the haptic module 154 is vibration. The intensity and pattern of vibration generated by the haptic module 154 can also be controlled. For example, different vibrations can be combined and output or sequentially output.

The haptic module 154 can generate a variety of haptic effects including an effect of stimulus according to arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using electrostatic force, and an effect according to reproduction of cold and warmth using an element capable of absorbing or radiating heat in addition to vibration.

The haptic module 154 not only transmits haptic effects through direct contact but also allows the user to feel haptic effects through a kinesthetic sense of the user's fingers or arms. The mobile terminal 100 may include two or more haptic modules 154.

The memory 160 can store a program for operation of the controller 180 and temporarily store input/output data (for example, phone book, messages, still images, moving images, etc.). The memory 160 can also store data about vibrations and sounds in various patterns that are output when a touch input is applied to the touch screen.

The memory 160 may include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The mobile terminal 100 can also operate in relation to a web storage performing the storing function of the memory 160 on the Internet.

The interface 170 serves as a path to external devices connected to the mobile terminal 100. The interface 170 receives data from the external devices or power and transmits the data or power to the internal components of the mobile terminal 100 or transmits data of the mobile terminal 100 to the external devices. For example, the interface 170 may include a wired/wireless headset port, an external charger port, a wired/wireless data port, a memory card port, a port for connecting a device having an identification module, an audio I/O port, a video I/O port, an earphones port, etc.

The identification module is a chip that stores information to authenticate the authority to use the mobile terminal 100. For example, the user identification module may be a user identify module (UIM), a subscriber identify module (SIM) and a universal subscriber identify module (USIM). An identification device including the user identification module may be manufactured in the form of a smart card. Accordingly, the identification device can be connected to the mobile terminal 100 through a port.

The interface 170 can also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle can be used as signals for confirming whether the mobile terminal is correctly set in the cradle.

The controller 180 can control overall operation of the mobile terminal. For example, the controller 180 performs control and processing for voice communication, data communication and video telephony. The controller 180 may include a multimedia module 181 for playing multimedia. The multimedia module 181 may be included in the controller 180 or may be separate from the controller 180.

The controller 180 can perform a pattern recognition process capable of recognizing handwriting input or picture-drawing input applied to the touch screen as characters or images.

The power supply 190 receives external power and internal power and provides power required for the operations of the components of the mobile terminal under the control of the controller 180.

Various embodiments explained herein can be implemented in a recording medium readable by a computer or the like, using, e.g., software, hardware or a combination thereof.

In the case of hardware implementation, the embodiments explained herein can be implemented using at least one of an application specific integrated circuit (ASIC), digital signal processor (DSP), digital signal processing device (DSPD), programmable logic device (PLD), field programmable gate array (FPGA), processor, controller, micro-controller, microprocessor, and electric unit for performing a function. In some cases, these embodiments can be implemented by the controller 180.

In the case of software implementation, the embodiments such as procedures or functions can be implemented with a separate software module that enables at least one function or task. A software code can be implemented by a software application written in an appropriate programming language. Also, the software code can be stored in the memory 160 and performed by the controller 180.

Hereinafter, exemplary embodiments of the present invention will be described below. In the following description, for convenience of explanation, it is assumed that the display unit 151 is a touch screen 151. As described above, the touch screen 151 can perform both an information display function and an information input function. However, it should be recognized that the present invention is not limited thereto. In addition, touch explained below may include both contact touch and proximity touch.

Figure 2:
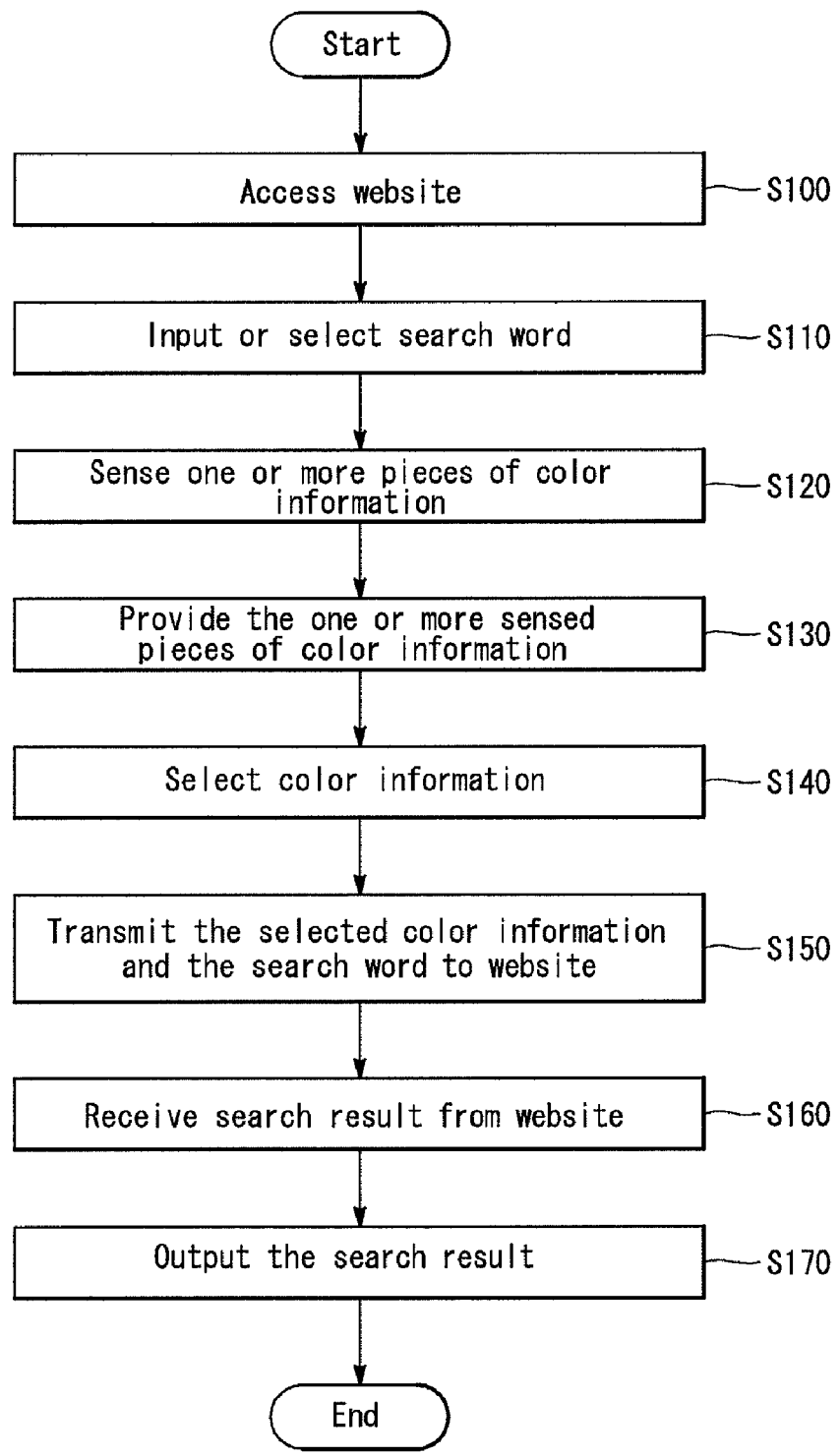
FIG. 2 is a flowchart of a method of performing functions using a mobile terminal according to a first embodiment of the present invention.

FIG. 2 is a flowchart of a method of performing functions using a mobile terminal according to a first embodiment of the present invention, and FIGS. 3a to 7 are diagrams illustrating examples of images in which the method of performing the functions using the mobile terminal according to the first embodiment of the present invention is implemented.

The method of performing the functions using the mobile terminal according to the first embodiment of the present invention can be implemented in the mobile terminal 100 explained with reference to FIG. 1, or in another appropriately configured mobile terminal. Hereinafter, the method of performing the functions using the mobile terminal according to the first embodiment of the present invention and operations of the mobile terminal 100 for implementing the same will be explained in detail below with reference to necessary drawings.

The controller 180 can access a specific website connected to the Internet through the radio communication unit 110 (step S100). For example, the controller 180 can access the Internet using the mobile communication module 112 or the wireless Internet module 113.

The website can provide a search function. The search function mentioned in this description may be used in various meanings.

For example, the search function may imply a function of searching a web using a specific search word or keyword. Representatively, the user accesses GOOGLE or YAHOO and does web surfing.

Moreover, the search function may imply a function of searching for contents corresponding to specific information in the specific connected website. For example, the user searches for goods in an Internet shopping mall, or searches for an image to be used as his/her blog background image in a website providing a blogging function.

The controller 180 receives input of a search word (or keyword) to perform the search function (step S110). The user can input a specific search word using the user input unit 130. Alternatively, when the display unit 151 is a touch screen, the user can input a specific search word using a virtual keyboard provided to the touch screen by the controller 180. Still alternatively, the user can select a specific search word in a search word list provided by the controller 180 or the connected website.

Figure 3A:
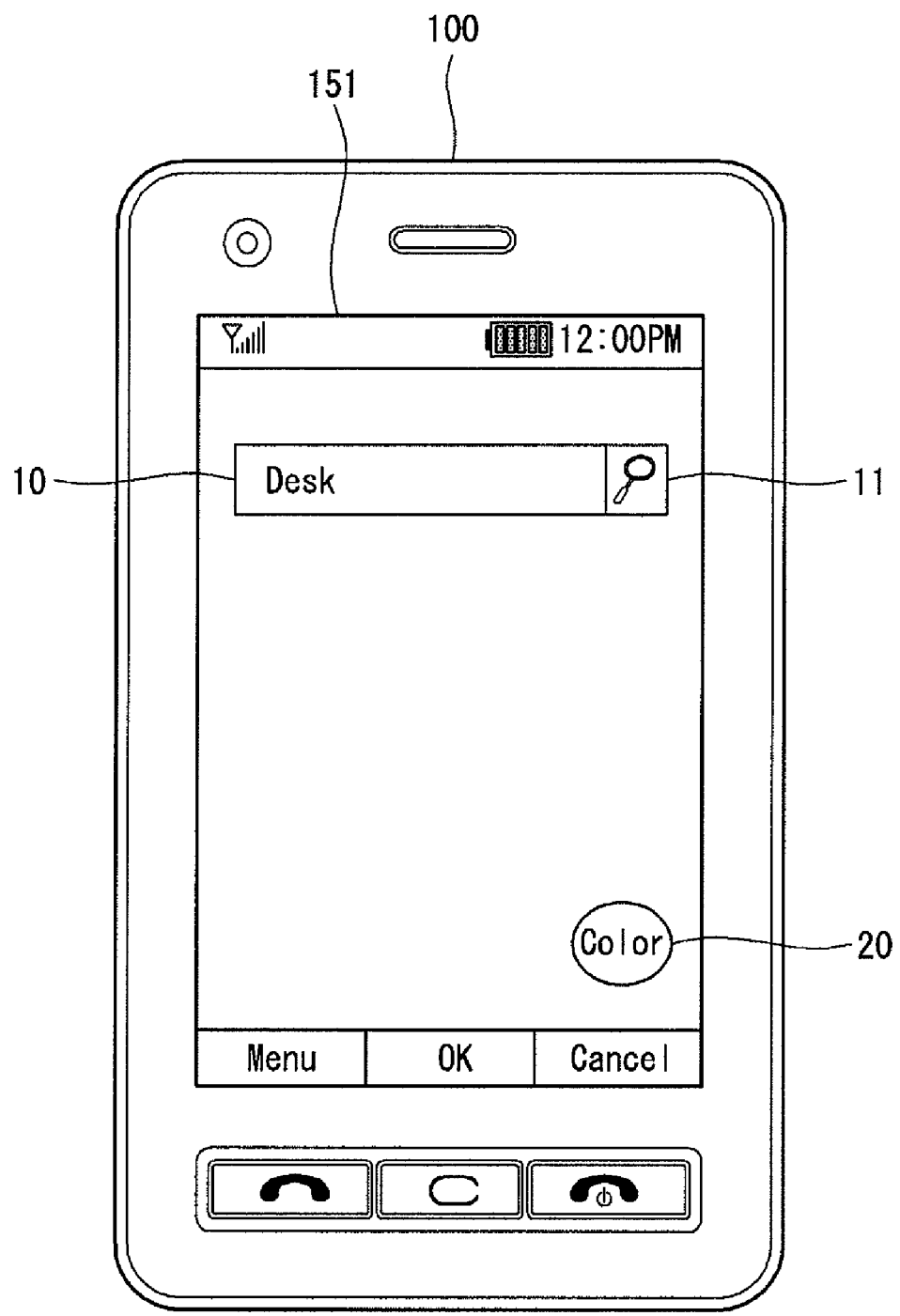
FIGS. 3a to 7 are diagrams illustrating examples of images in which the method of performing the functions using the mobile terminal according to the first embodiment of the present invention is implemented.
Figure 3B:
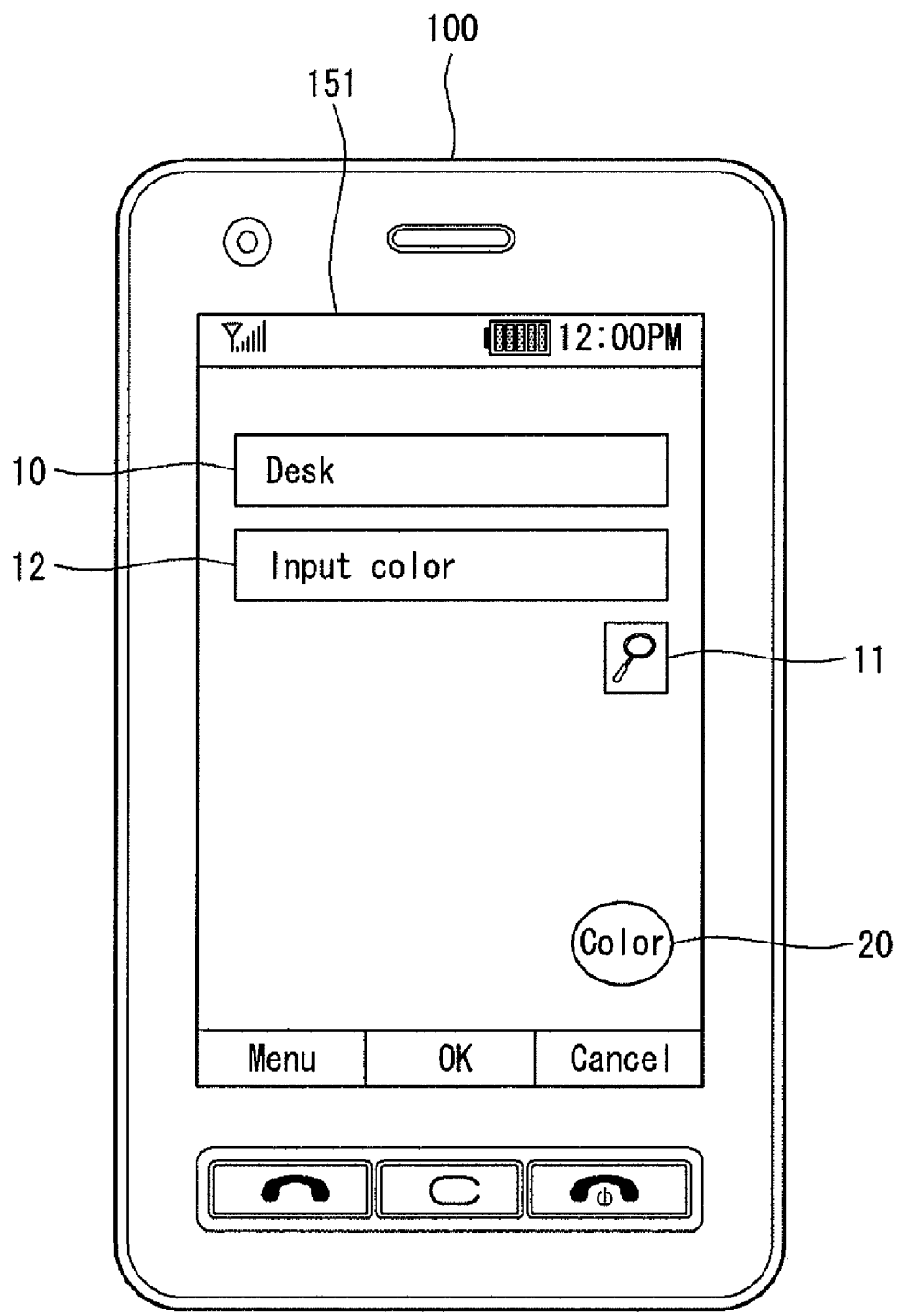

FIGS. 3a and 3b illustrate an example of an image in which the controller 180 accesses the website providing the search function.

In one example shown in FIG. 3a, the website may provide a search window 10 and a search icon 11 for receiving input of search performance. In another example shown in FIG. 3b, the website may provide the search window 10, the search icon 11, and a color input window 12 for receiving input of color information. Other examples are also possible.

Reference numeral 20 shown in FIGS. 3a and 3b denotes an example of a function icon 20 for acquiring color information of a peripheral or external object using the color sensor 141. The function icon 20 may be provided by the controller 180 or the connected website.

Figure 3C:
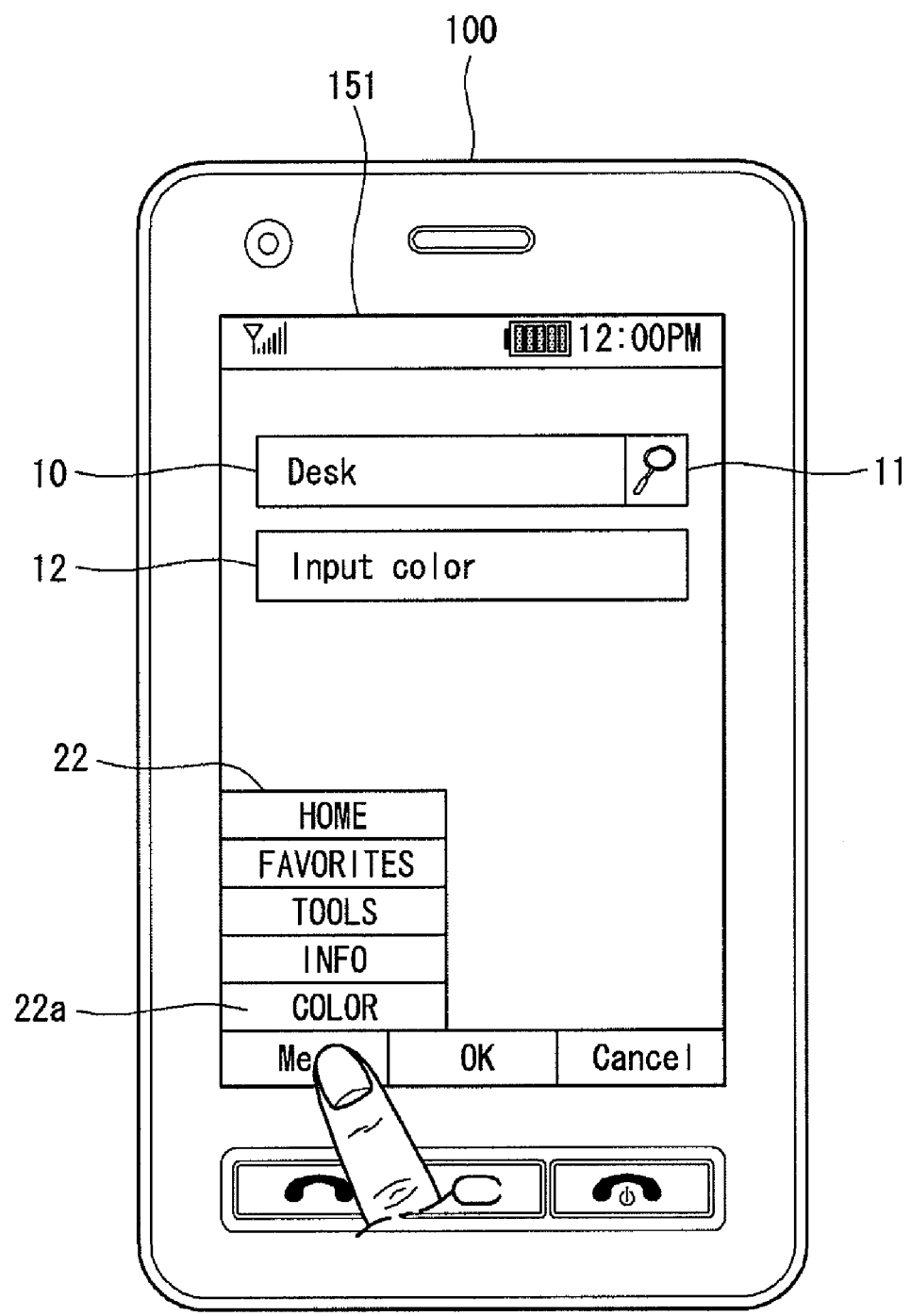

The function icon 20 may be replaced by a specific menu 22a in a menu window 22 shown in FIG. 3c.

As described later, the user can select the function icon 20 or the specific menu 22a provided in the menu window 22 to acquire the color information of the peripheral or external object.

FIGS. 3a and 3b show a case where 'Desk' is input as the search word or keyword to perform the search function.

Hereinafter, it is assumed that the connected website provides the image shown in FIG. 3b, and the first embodiment of the present invention will be explained below according to this assumption.

The controller 180 drives the color sensor 141 to sense one or more pieces of color information from the peripheral or external object (step S120).

Figure 4A:
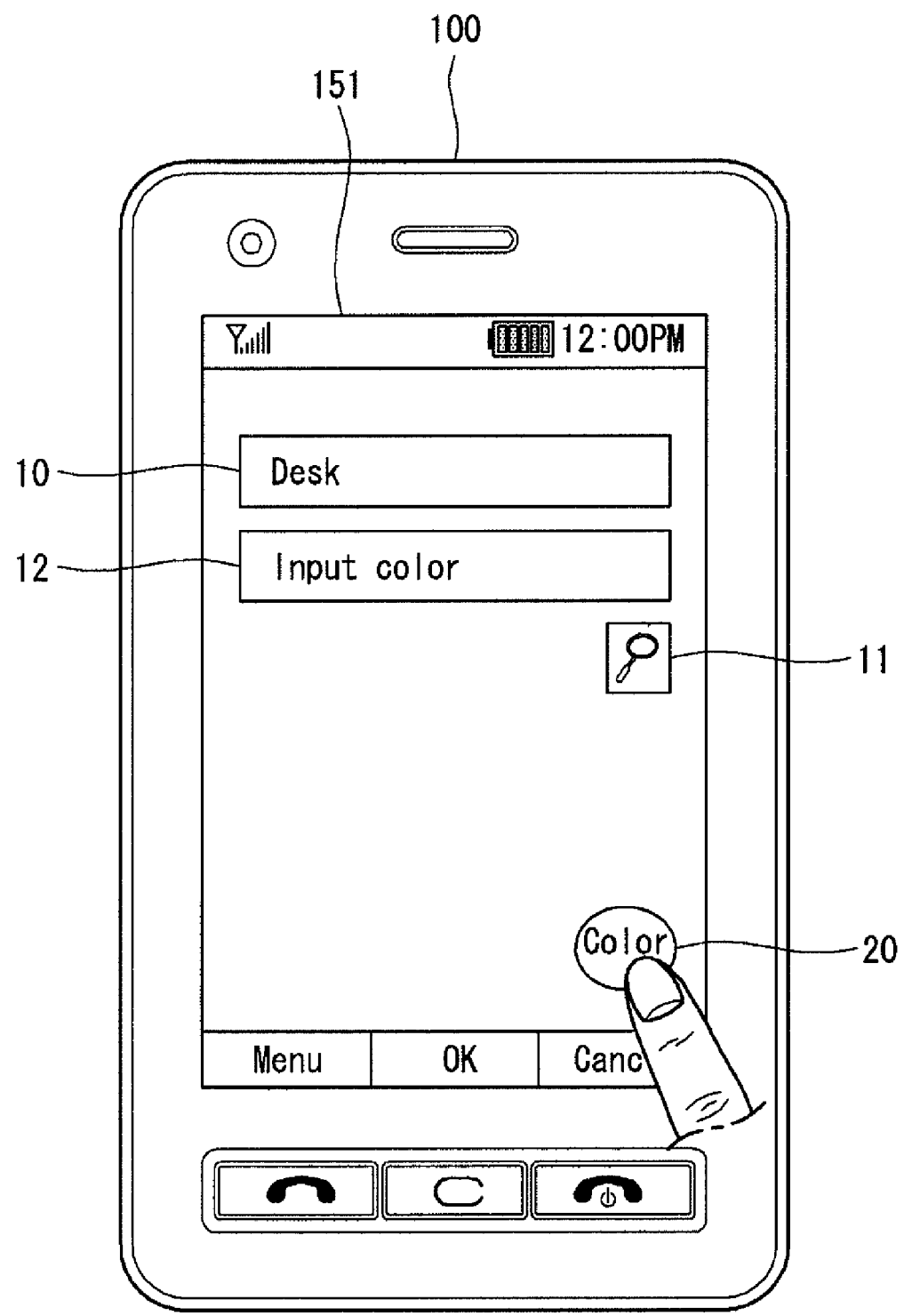
Figure 4B:
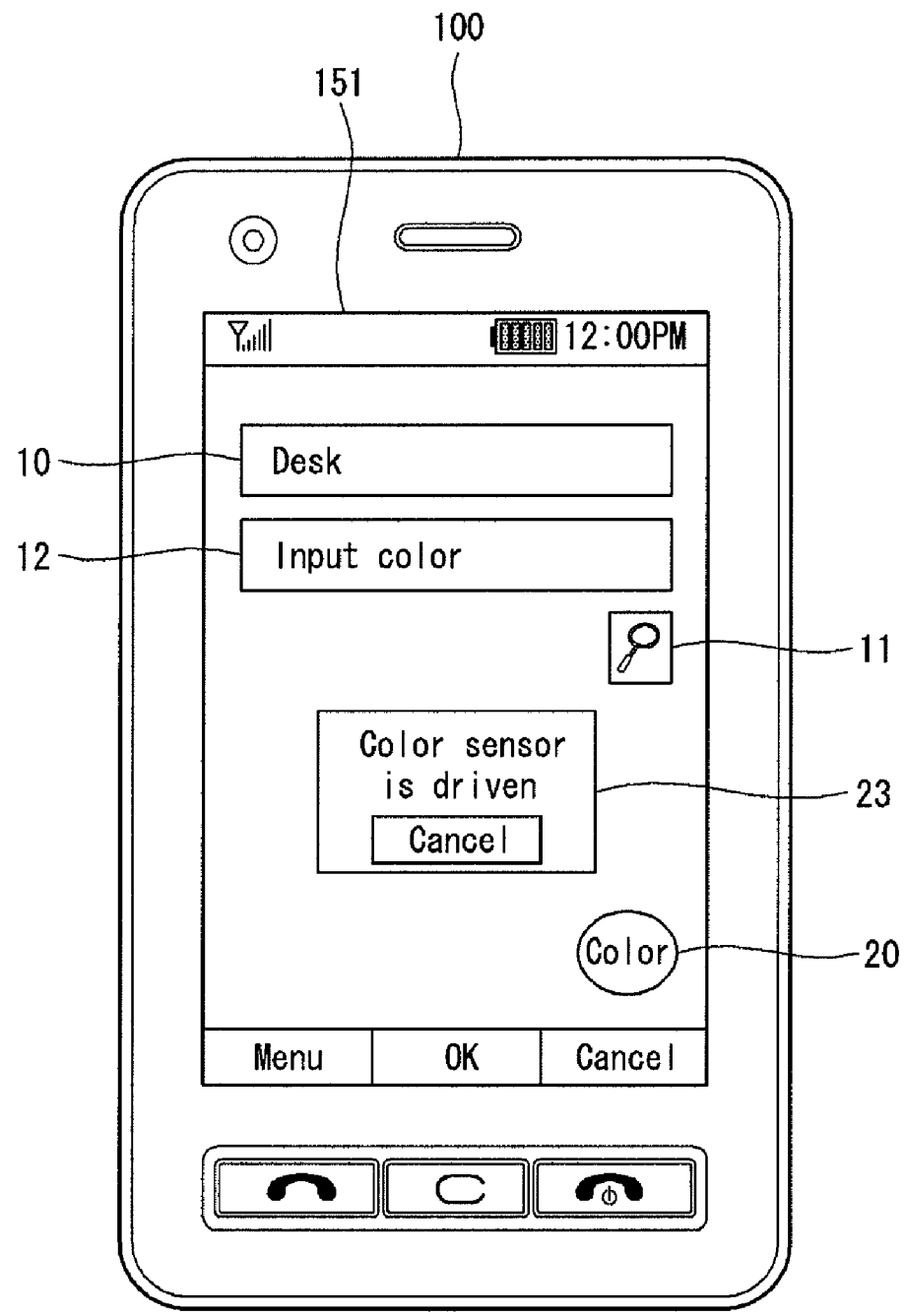

As illustrated in FIG. 4a, the user can select the function icon 20 for the sensing operation. As illustrated in FIG. 4b, with the selection of the function icon 20, the controller 180 can display, on the display unit 151, an announcement window 23 that announces that the color sensor 141 is sensing color information.

The controller 180 can provide the one or more sensed pieces of color information (step S130).

Figure 4C:
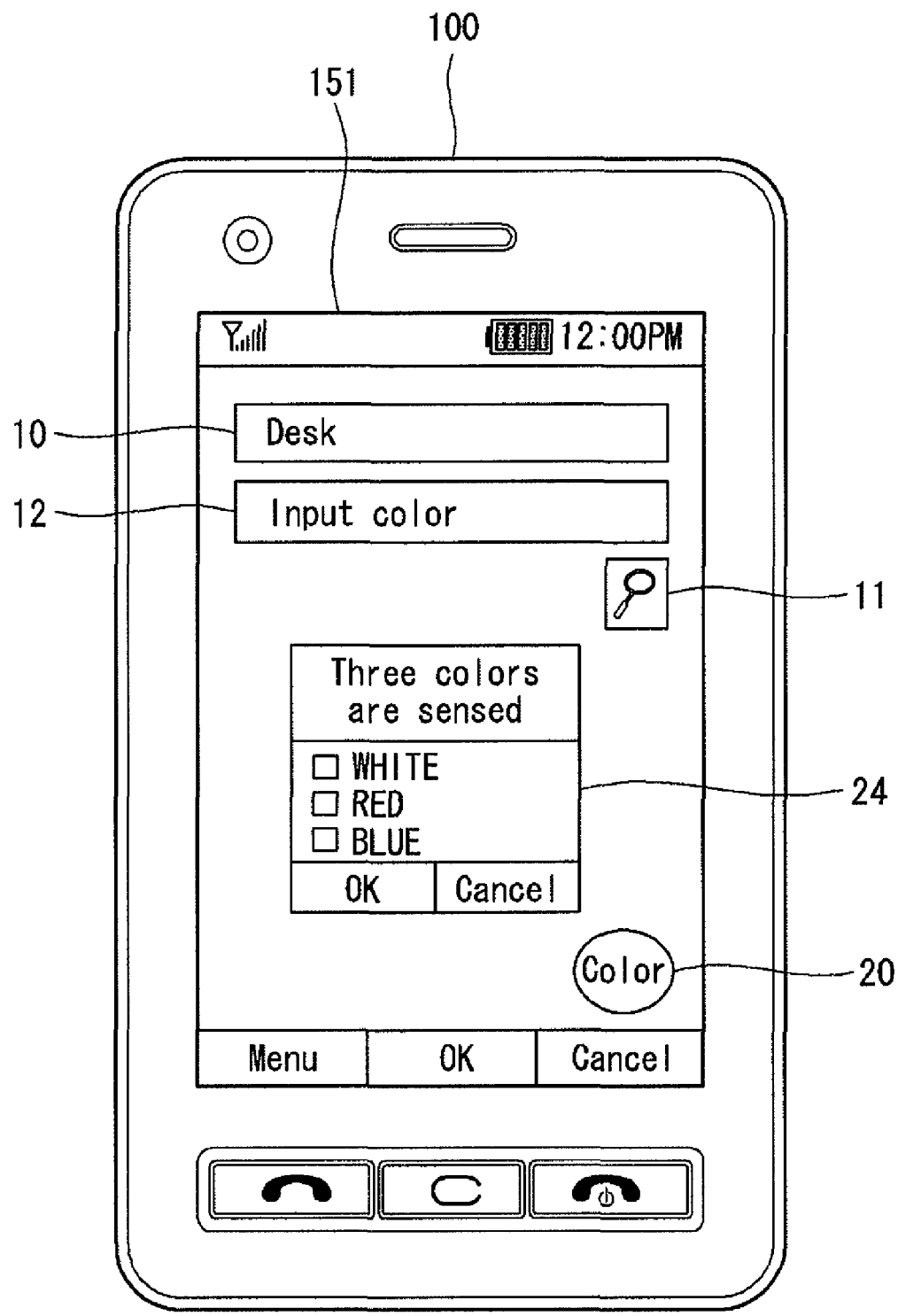

FIG. 4c illustrates an example in which plural pieces of color information are provided to the display unit 151. As illustrated in FIG. 4c, the controller 180 can display, on the display unit 151, a color information providing region 24 that contains the one or more pieces of color information sensed in step S120.

The controller 180 can receive a signal that selects specific color information from the one or more pieces of color information provided in step S130 (step S140).

Figure 4D:
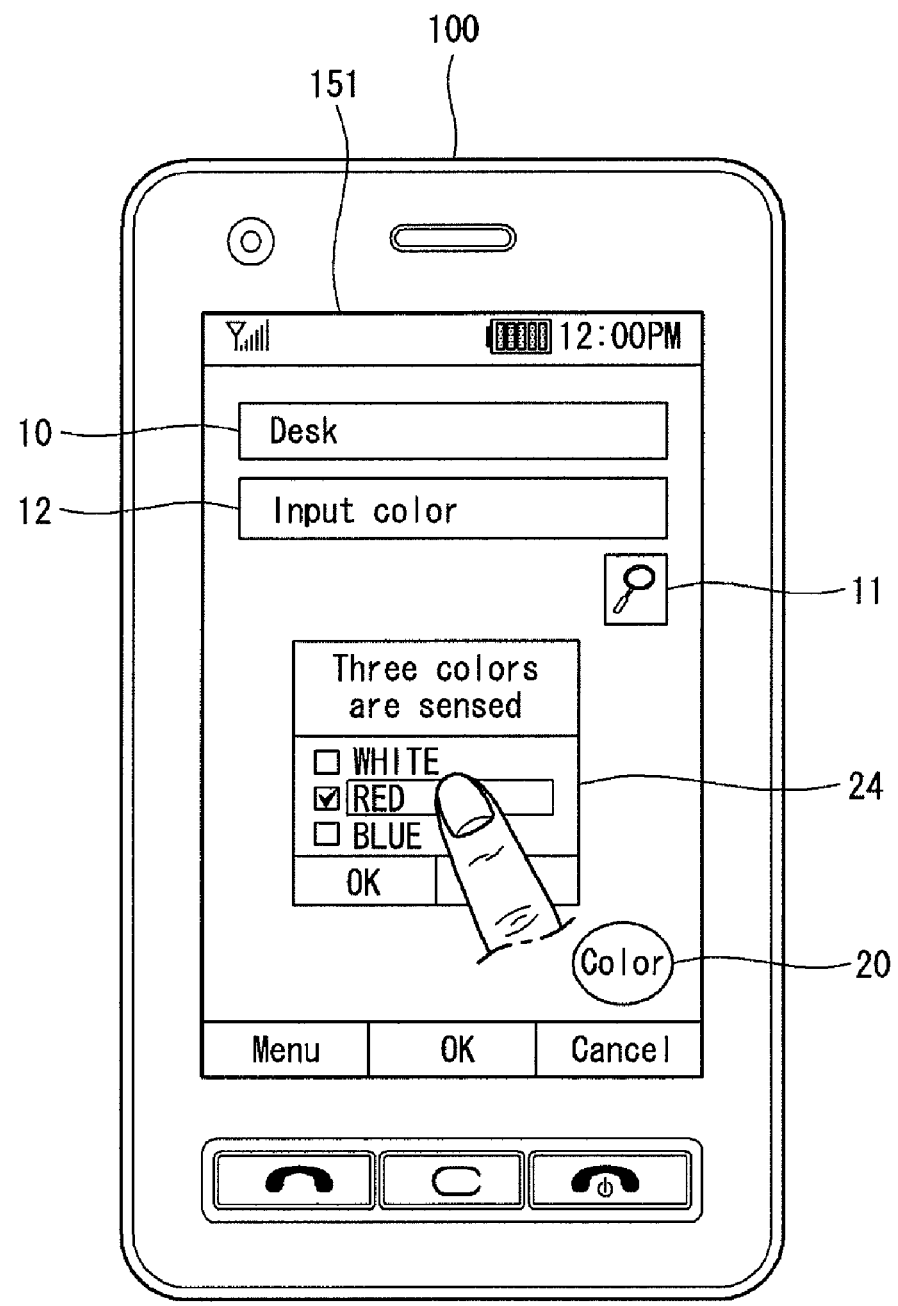
Figure 4E:
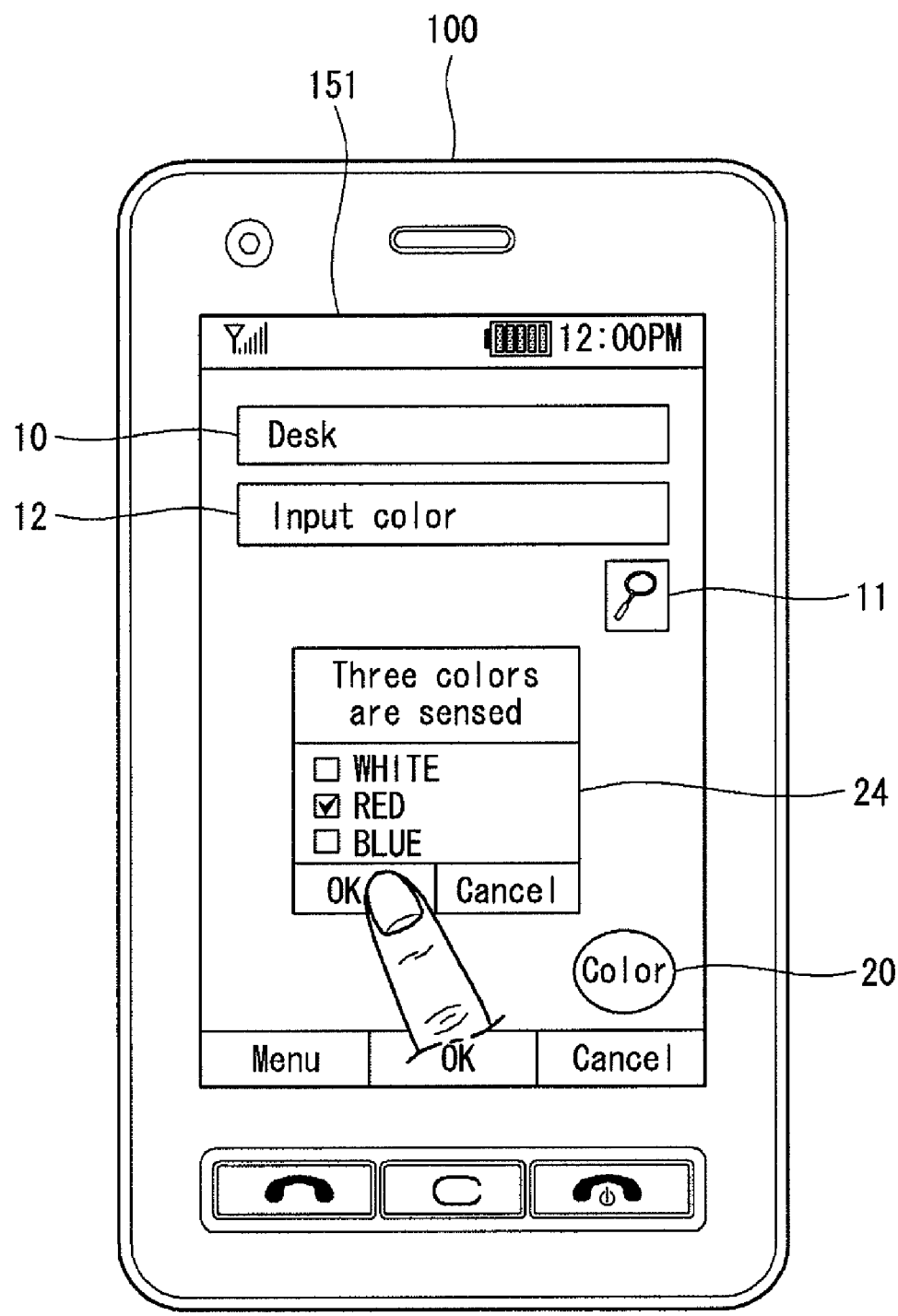

FIG. 4d illustrates an example in which the user selects 'Red' among the plural pieces of color information provided in the color information providing region 24. As illustrated in FIG. 4e, the user can finish the process of selecting specific color information by selecting 'OK' button.

Figure 4F:
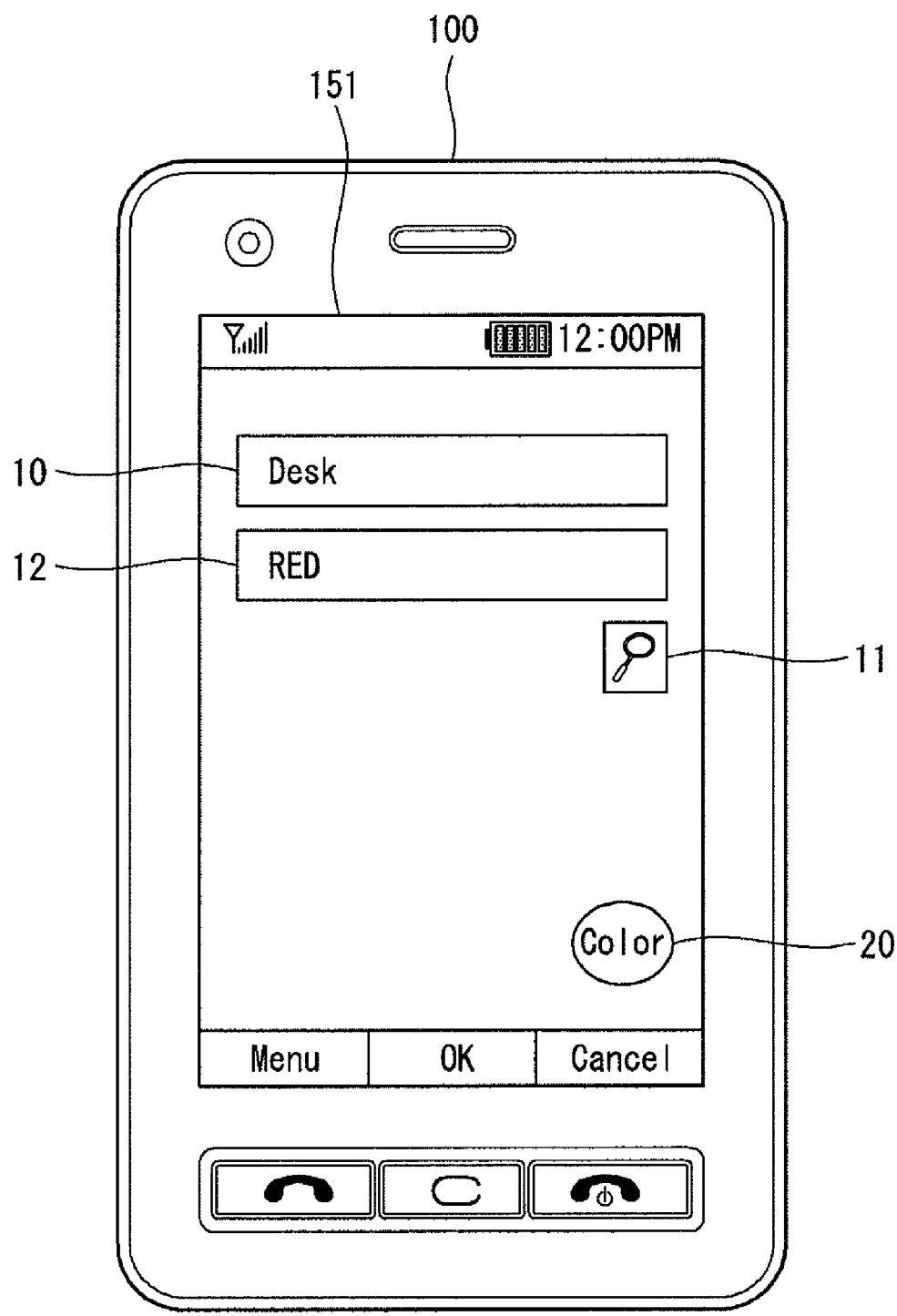

FIG. 4f illustrates an example in which the color information selected by step S140 is displayed in the color input window 12.

Although the color information is selected via the user's manual selection above, the technical ideas disclosed in this description are not limited thereto.

For example, the user may cause the mobile terminal 100 to change color information transferred in real time from the color sensor 141 to the controller 180. After the color sensor 141 is driven via selection of the function icon 20, color information acquired by the color sensor 141 can be displayed in the color input window 12 in real time.

The controller 180 can transmit the color information selected in step S140 and the search word to the website (step S150).

Figure 4G:
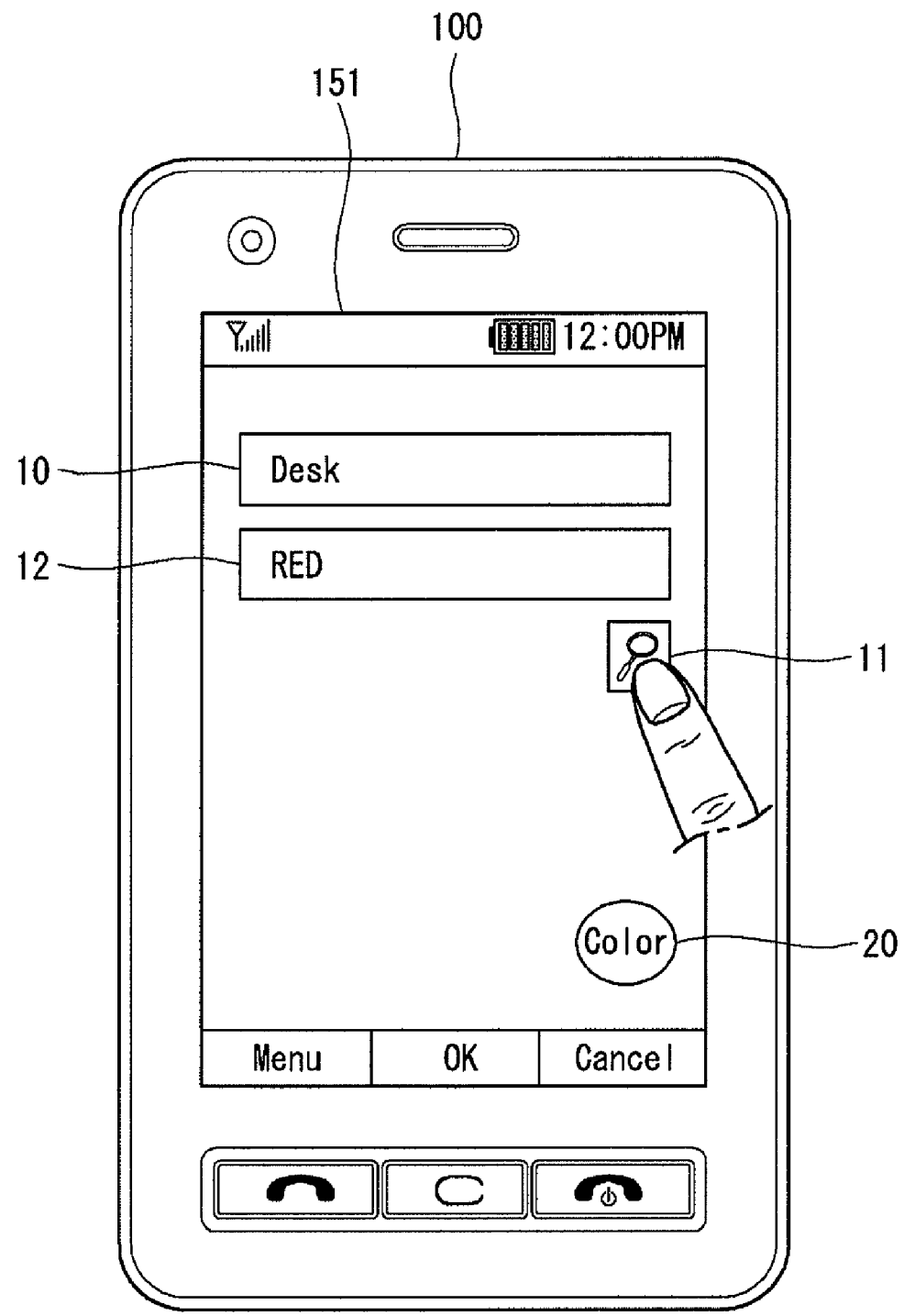

Web transmission of the color information and the search word may be implemented in various ways. For example, step S150 may be performed when selection of the color information is finished in step S140. Alternatively, for example, as illustrated in FIG. 4g, step S150 may be performed when the search icon 11 is selected.

Meanwhile, although the search word is input first and the color information is selected later above, the technical ideas disclosed in this description are not limited thereto.

For example, when the search word is input or the search icon 11 is selected, color information currently transferred from the color sensor 141 may be transmitted automatically to the website. While the controller 180 buffers the color information transferred substantially in real time from the color sensor 141, as soon as inputting of the search word is done, the controller 180 may transmit the color information presently stored in its buffer to the website with the search word.

In addition, for example, as illustrated in FIG. 3a, when the website provides only the search window 10 as a search region, after the user inputs a search word through the search window 10, as soon as the color sensor 141 senses color information, the controller 180 may transmit the search word and the sensed color information to the website.

As the search icon 11 is selected in the mobile terminal 100, the website performs the search function using the search word and the color information.

According to the embodiment shown in FIGS. 3a to 4g, the website performs the search function in conditions of 'Desk', 'Red' and 'And'.

For example, if the website relates to a shopping mall, the website can search for the 'Desk' of 'Red' color. In addition, for example, if the website is a portal site providing a web search function, the website can search a web by a web search robot, designating 'Red' and 'Desk' as search words.

Figure 5A:
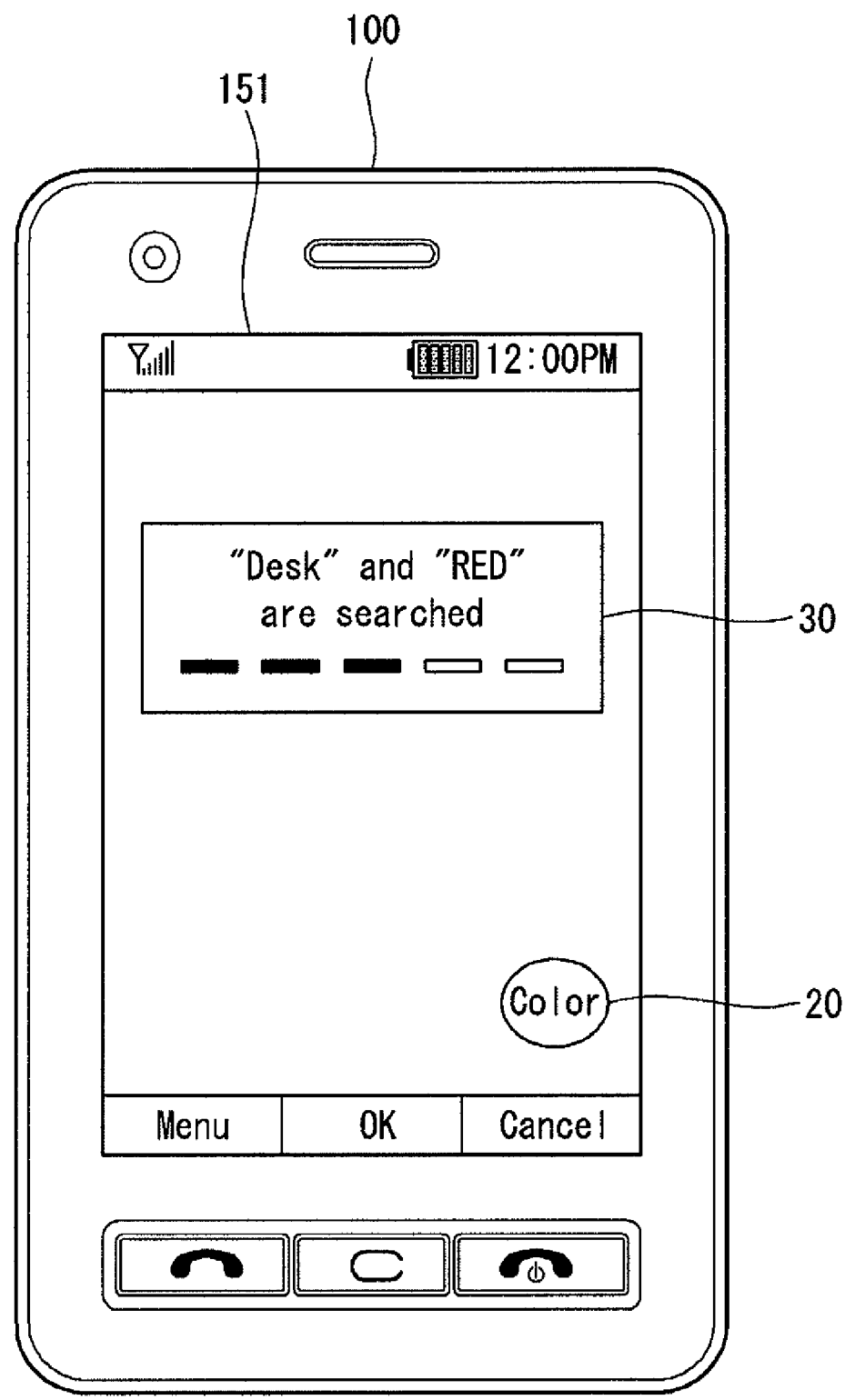

FIG. 5a illustrates an example of a message 30 provided to the display unit 151 of the mobile terminal 100, while the website performs the search function. The message 30 may be provided by the mobile terminal 100 or the website.

The website transmits a performance result of the search function to the mobile terminal 100.

The controller 180 can receive the search result of the performed search function from the website through the radio communication unit 110 (step S160), and output the received search result (step S170).

Figure 5B:
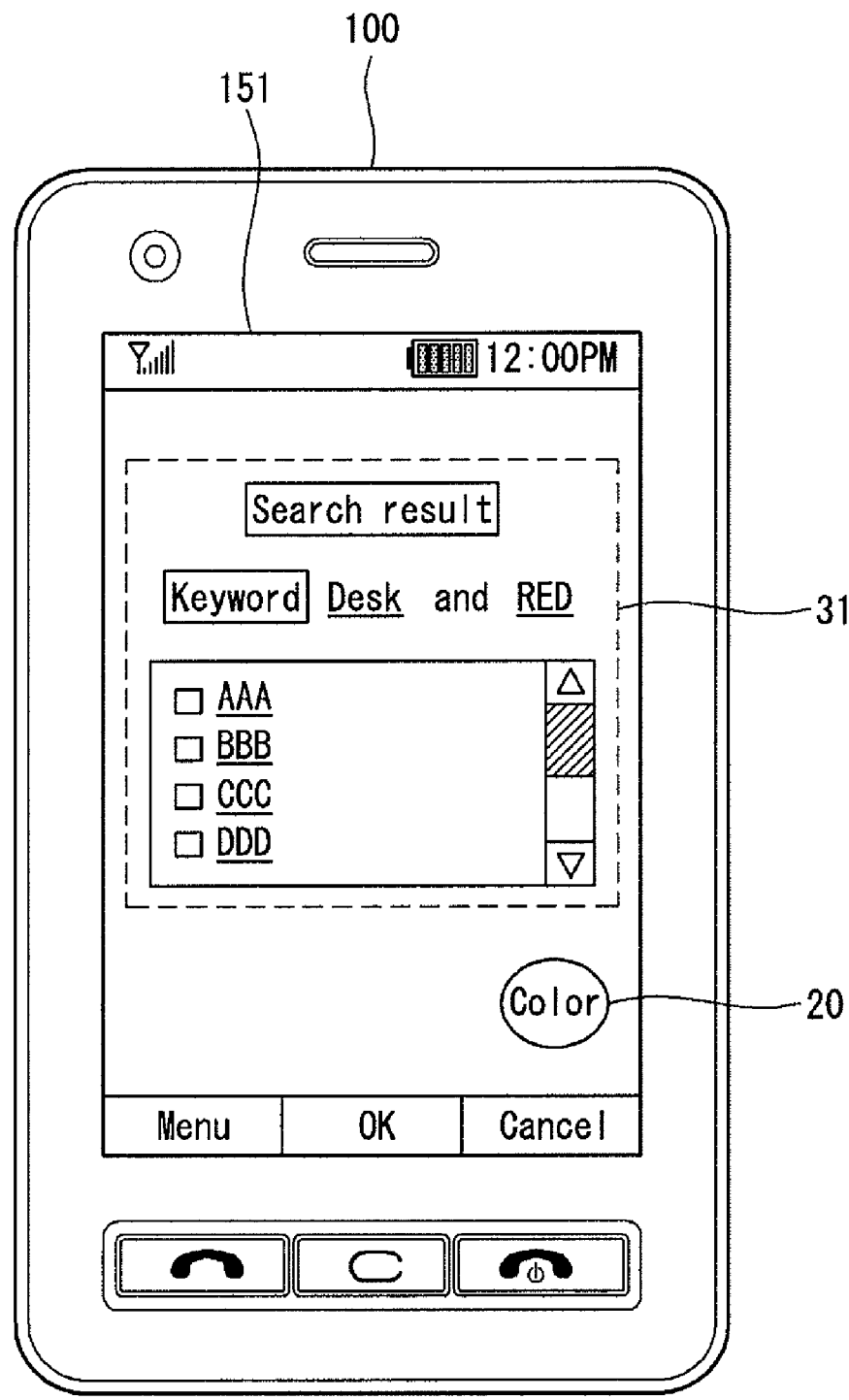

FIG. 5b illustrates an example in which the controller 180 receives a search result 31 using 'Desk' and 'Red' as keywords from the website through the radio communication unit 110, and displays the search result 31 on the display unit 151.

Figure 6:
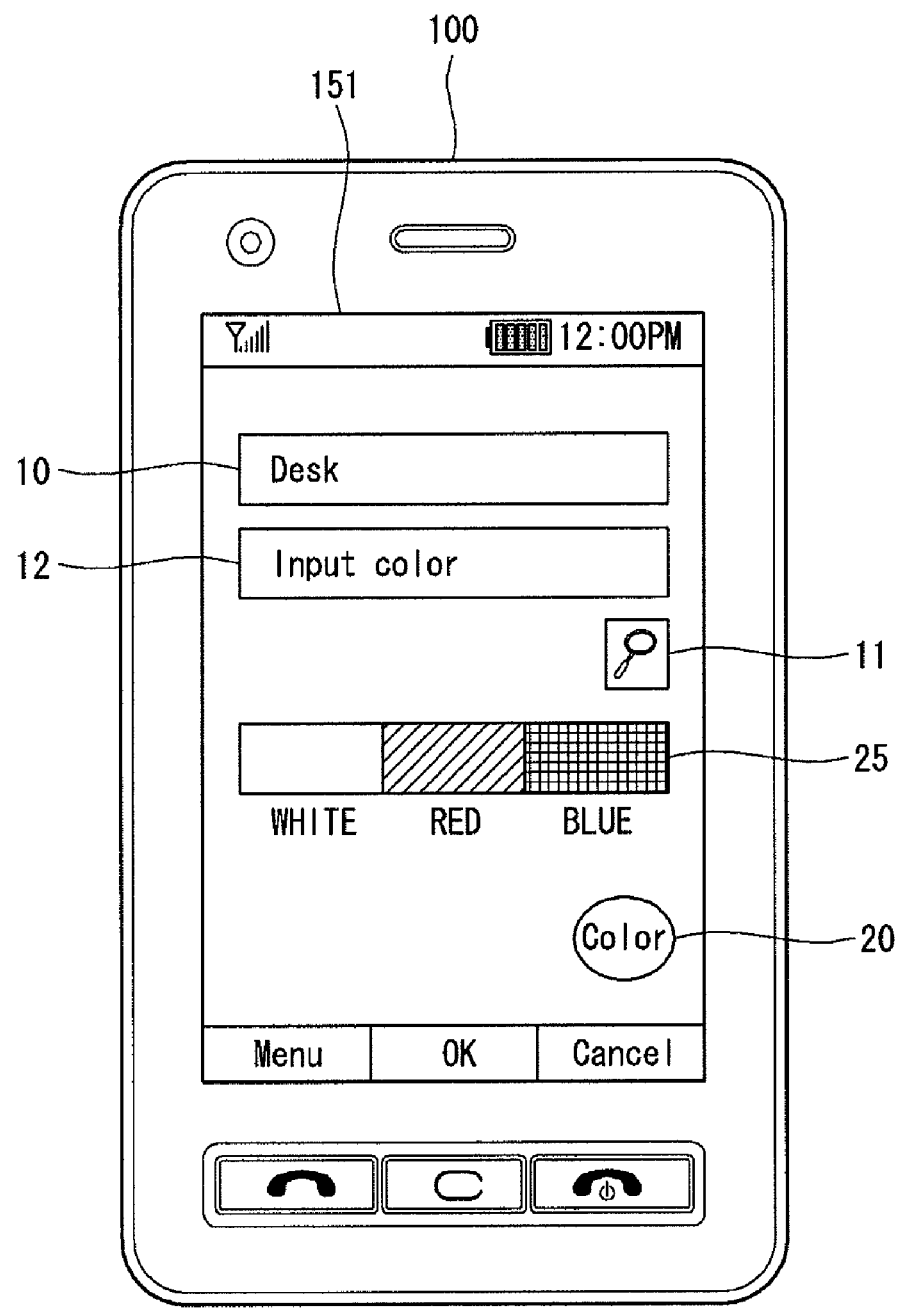
Figure 7:
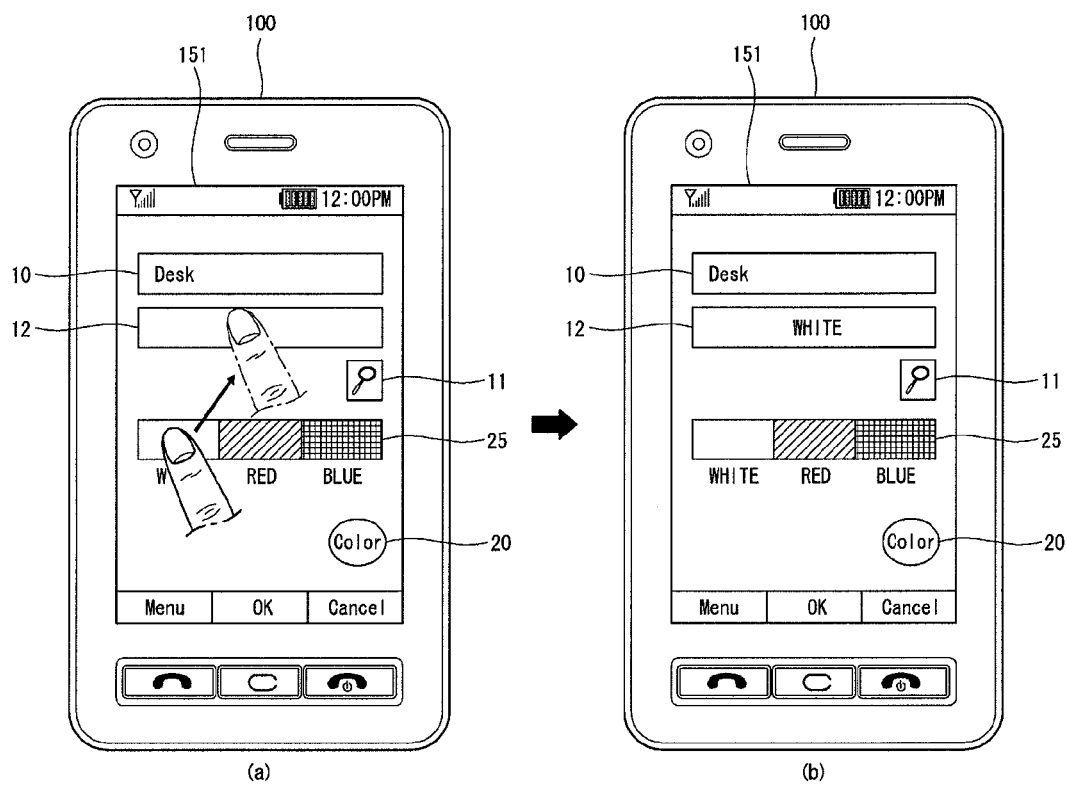

FIGS. 6 and 7 illustrate another example of the method of selecting the color information as explained in step S140.

Referring to FIG. 6, the controller 180 can provide the display unit 151 with a color window 25 that displays colors corresponding to the plural acquired pieces of color information, respectively, as a result of step S120.

Referring to FIG. 7(a), the user can touch a favorite color with his/her finger among the colors displayed in the color window 25 and drag the color to the color input window 12. Alternatively, the user can transfer the color to the color input window 12 with a tap, double tap, swipe or other predetermined motion. The motion can be set or reset by the user.

Referring to FIG. 7(b), the controller 180 can display 'White' in the color input window 12 according to the user's dragging operation. The color information displayed in the color input window 12 can be transferred to the website.

Although the user drags specific color information to the color input window 12 that is a color selection region in FIGS. 6 and 7, the present invention is not limited thereto.

For example, the user may drag specific color information to the search window 10 that is a search region. As illustrated in FIG. 3a, when the website provides only the search region as an input region, the user can drag the specific color information to the search window 10.

The first embodiment of the present invention has been described above in the assumption that the user intends to search for a 'Desk' of a specific color using the search function provided in the website.

As set forth herein, the technical ideas disclosed in this description are not limited thereto. For example, according to a method similar to the foregoing embodiment, the mobile terminal 100 may transmit color information acquired through the color sensor 141 to a specific website.

The color information transmitted to the website may be used in association with various functions provided in the website.

For example, as described above, a background image corresponding to the color information transmitted to the website may be applied to a blog provided in the website.

Moreover, the specific website may request the user to input his/her favorite color information in the user's profile. Here, the user drives the color sensor 141 and puts the mobile terminal 100 over an object (e.g., book, clothes, wall) of his/her favorite color, so that the controller 180 of the mobile terminal 100 can control the color sensor 141 to acquire color information, and transfer the color information to the specific website.

According to the first embodiment of the present invention described above, the color sensor 141 can serve as input means in a narrow meaning for the mobile terminal 100 or the user. The narrow meaning of the input means is that the color sensor 141 can input color information that the user should input through the keypad or virtual keypad.

According to second and third embodiments of the present invention described below, the color sensor 141 can serve as input means in a broad meaning for the mobile terminal 100 or the user. The broad meaning of the input means is that the color sensor 141 can input commands that the user should input through the keypad or virtual keypad.

Figure 8:
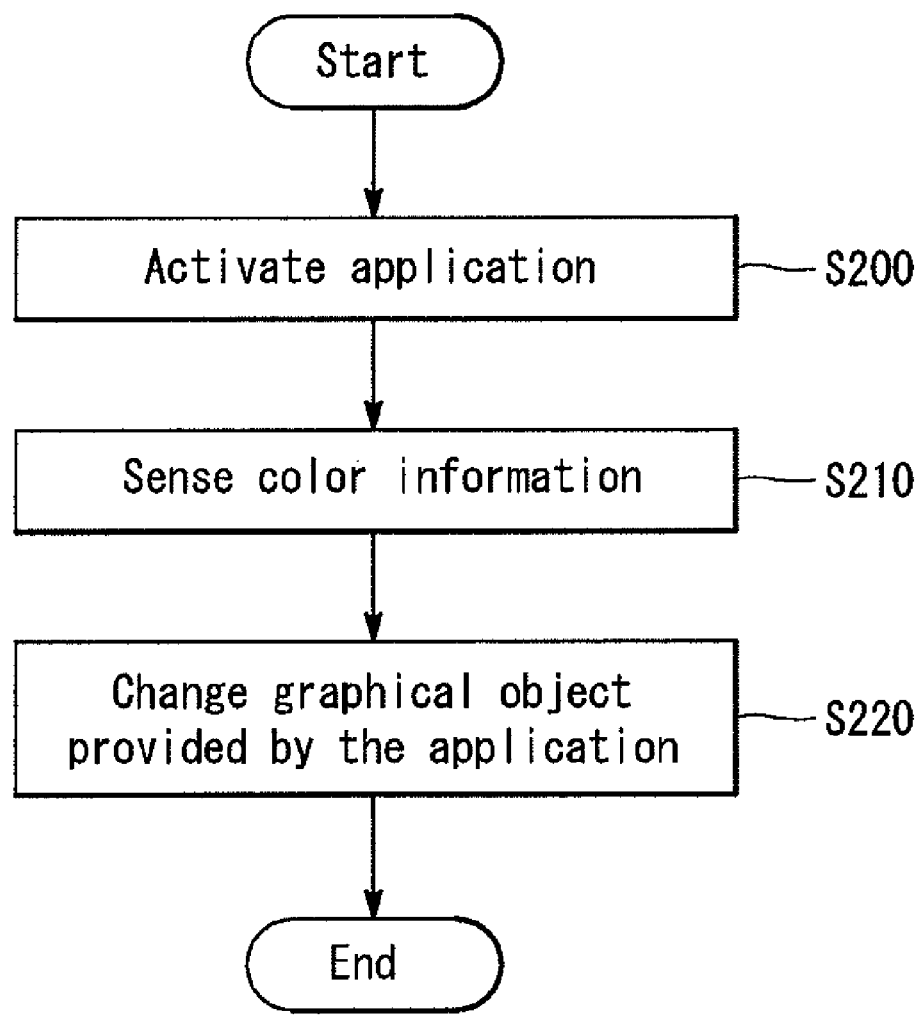
FIG. 8 is a flowchart of a method of performing functions using a mobile terminal according to a second embodiment of the present invention.
Figure 9:
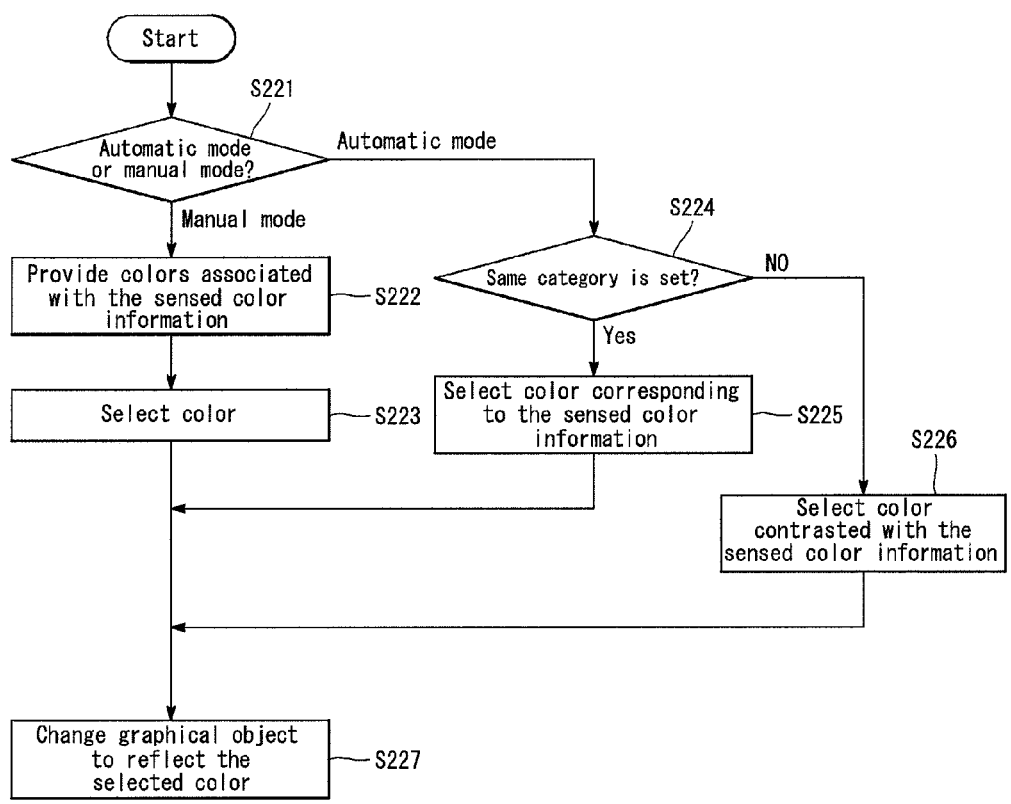
FIG. 9 is a detailed flowchart of step S220 of FIG. 8.

FIG. 8 is a flowchart of a method of performing functions using a mobile terminal according to a second embodiment of the present invention, FIG. 9 is a detailed flowchart of step S220 of FIG. 8, and FIGS. 10 to 16b are diagrams illustrating examples of images in which the method of performing the functions using the mobile terminal according to the second embodiment of the present invention is implemented.

The method of performing the functions using the mobile terminal according to the second embodiment of the present invention can be implemented in the mobile terminal 100 explained with reference to FIG. 1, or in another appropriately configured terminal. Hereinafter, the method of performing the functions using the mobile terminal according to the second embodiment of the present invention and operations of the mobile terminal 100 for implementing the same will be explained in detail below with reference to necessary drawings.

The memory 160 provided in the mobile terminal 100 can store one or more applications. In addition, the memory 160 can store Graphical User Interfaces (GUI) corresponding to the one or more applications, respectively. The GUI optionally contains one or more graphical objects. Exemplary graphical objects include a background image, an icon and a menu. The graphical object may include all graphical elements forming the GUI.

When a specific application is activated, the controller 180 can invoke a GUI corresponding to the specific activated application, referring to the memory 160, and display the GUI on the display unit 151.

The controller 180 activates a specific application (step S200). A process of activating the specific application may be implemented in various ways.

For example, when the mobile terminal 100 is in an idle mode, if the display unit 151 is on, an application that manages a background image displayed on the display unit 151 may be activated automatically.

In addition, for example, an application that manages a phonebook may be activated by the user's command. Here, the controller 180 can display the phonebook on the display unit 151.

Moreover, for example, when receiving a message, an E-mail or a call from the outside through the radio communication unit 110, the controller 180 may activate an application that manages the same and display the corresponding GUI on the display unit 151.

The controller 180 can drive the color sensor 141 by the user's command or automatically to sense external color information (step S210).

Here, if a specific predesignated application is activated, the controller 180 can drive the color sensor 141 to automatically sense external color information. Alternatively, the controller 180 may receive the user's command and sense external color information through the color sensor 141.

The controller 180 can change a graphical object provided by the activated application, based on the color information transferred from the color sensor 141 (step S220).

Here, the controller 180 may change the graphical object into another different graphical object or change a color of the graphical object.

As mentioned above, there are various graphical objects such as a background image and an icon. In addition, the graphical object may be changed in various modes and/or ways. Hereinafter, a detailed process of performing step S220 will be explained below with reference to FIG. 9.

The controller 180 can judge whether or not a function mode according to the second embodiment of the present invention has been set as an automatic mode or a manual mode (step S221).

When the function mode is set as the manual mode, the controller 180 can provide the display unit 151 with colors associated with the sensed color information (step S222).

The colors associated with the sensed color information may be preset. For example, a color belonging to a category contrasted with the color corresponding to the color information sensed through the color sensor 141, and/or a color belonging to the same category as the corresponding color may be the colors associated with the sensed color information.

The contrasted category means a complementary color relation. For example, green G and magenta M, yellow Y and blue B, and cyan C and red R each have a complementary color relation, respectively.

For example, when the color information sensed through the color sensor 141 is red R, cyan C (that belongs to the contrasted category) may be determined to be the color associated with the sensed color information.

The color belonging to the same category may include not only a color matching with the sensed color information accurately but also a color of similar color sense. For example, when the color information sensed through the color sensor 141 is red R, red R and pink that belong to the same category may be determined as the colors associated with the sensed color information.

At the above step S222, the controller 180 can provide a user interface so that the user can select at least one of the color belonging to the contrasted category and the color belonging to the same category.

The controller 180 receives a selection signal that selects at least one of the colors provided in step S222 (step S223).

The controller 180 can change the graphical object to reflect the at least one color selected in step S223 (step S227).

In the meantime, when the function mode is set as the automatic mode in a judgment result of step S221, the controller 180 judges whether a same category mode that determines a color belonging to the same category as the color corresponding to the sensed color information as a color to be reflected to the graphical object has been set (step S224).

When the same category mode is set in a judgment result of step S224, the controller 180 can select the color corresponding to the sensed color information (step S225), and change the graphical object to reflect the selected color (step S227).

When the same category mode is not set in the judgment result of step S224, the controller 180 can select a color that contrasts the sensed color information (step S226), and can change the graphical object to reflect the selected color (step S227).

Hereinafter, implementation examples of the second embodiment of the present invention will be described in more detail below with reference to FIGS. 10 to 16b.

Figure 10:
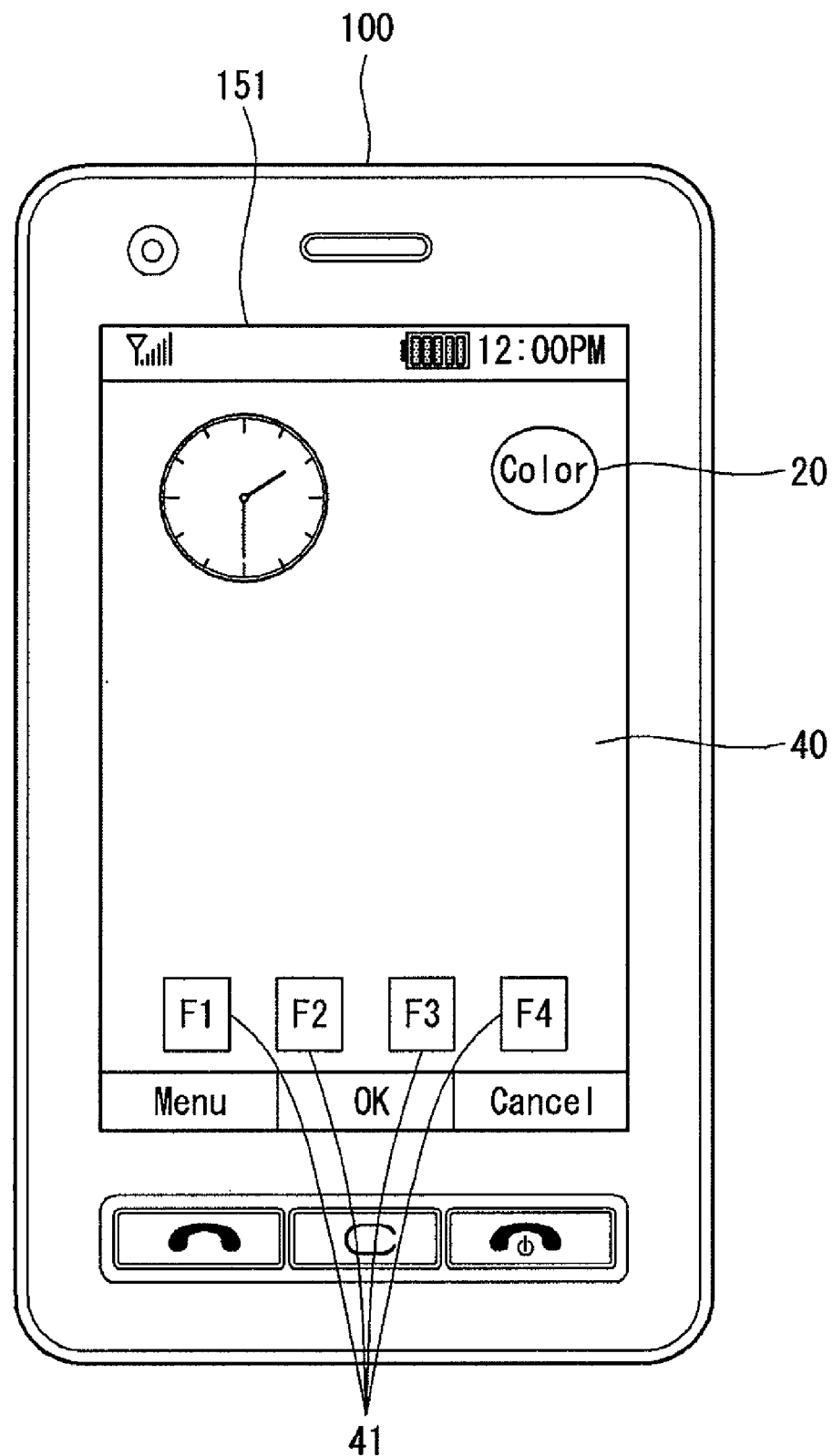
FIGS. 10 to 16b are diagrams illustrating examples of images in which the method of performing the functions using the mobile terminal according to the second embodiment of the present invention is implemented.

FIG. 10 illustrates an example in which, when the mobile terminal 100 is in an idle state (or standby mode), an application that manages the idle state is activated. The application that manages the idle state can manage displaying of a background image 40 and icons 41 and 20 provided to the background image 40. The background image 40 and the icons 41 and 20 may correspond to the graphical objects provided by the application that manages the idle state.

Figure 11:
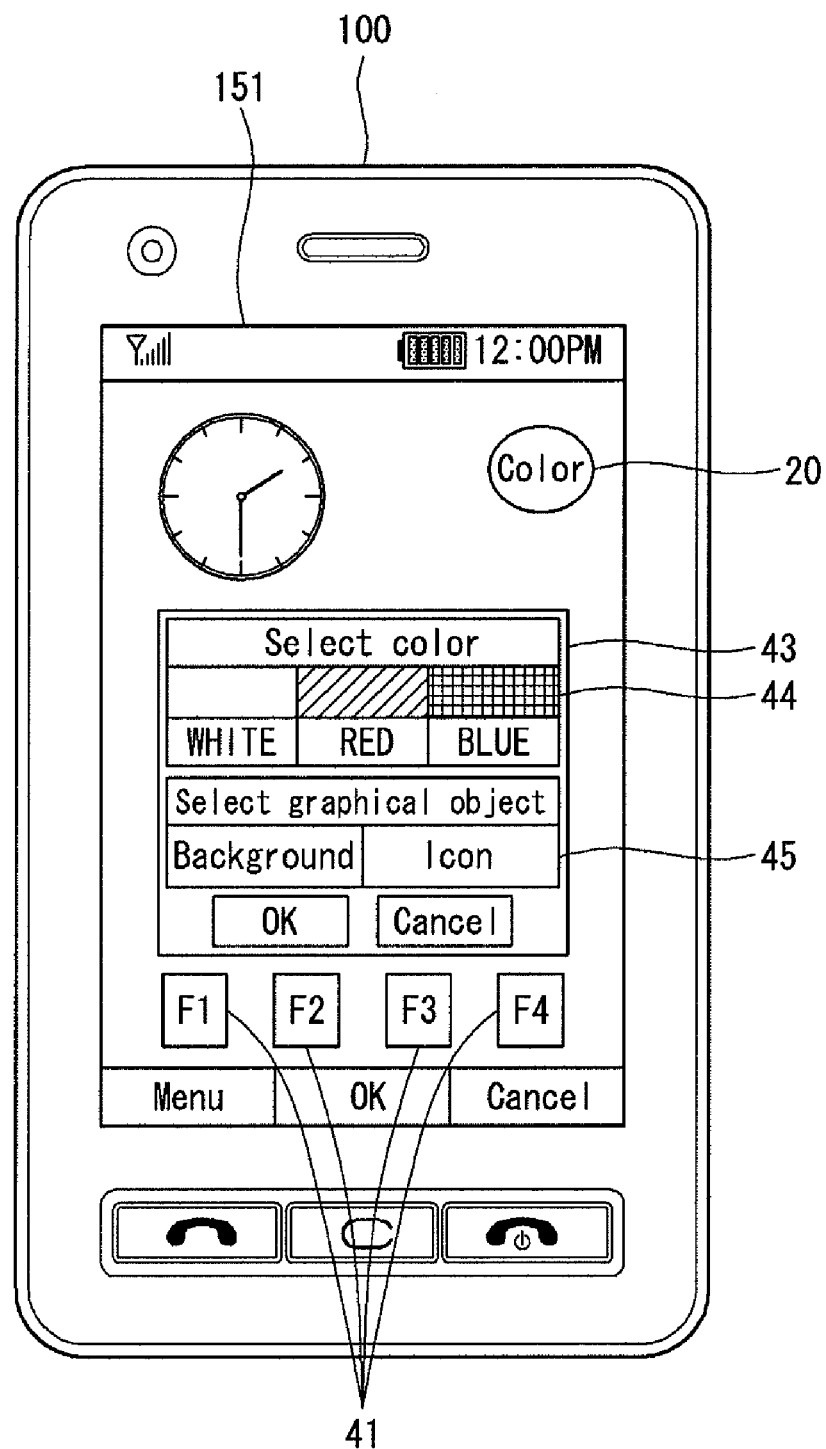

As a result of performing the above step S210 through the controller 180, an image shown in FIG. 11 may be provided. As illustrated in FIG. 11, the controller 180 may provide the display unit 151 with an information region 43 that contains the result of step S210.

The information region 43 may include a color information region 44 that provides plural pieces of color information acquired through the color sensor 141 so that the user can select one or more pieces of color information, and a graphical object selection region 45 that enables the user to select a graphical object so as to reflect some or the whole of the acquired color information.

Figure 12A:
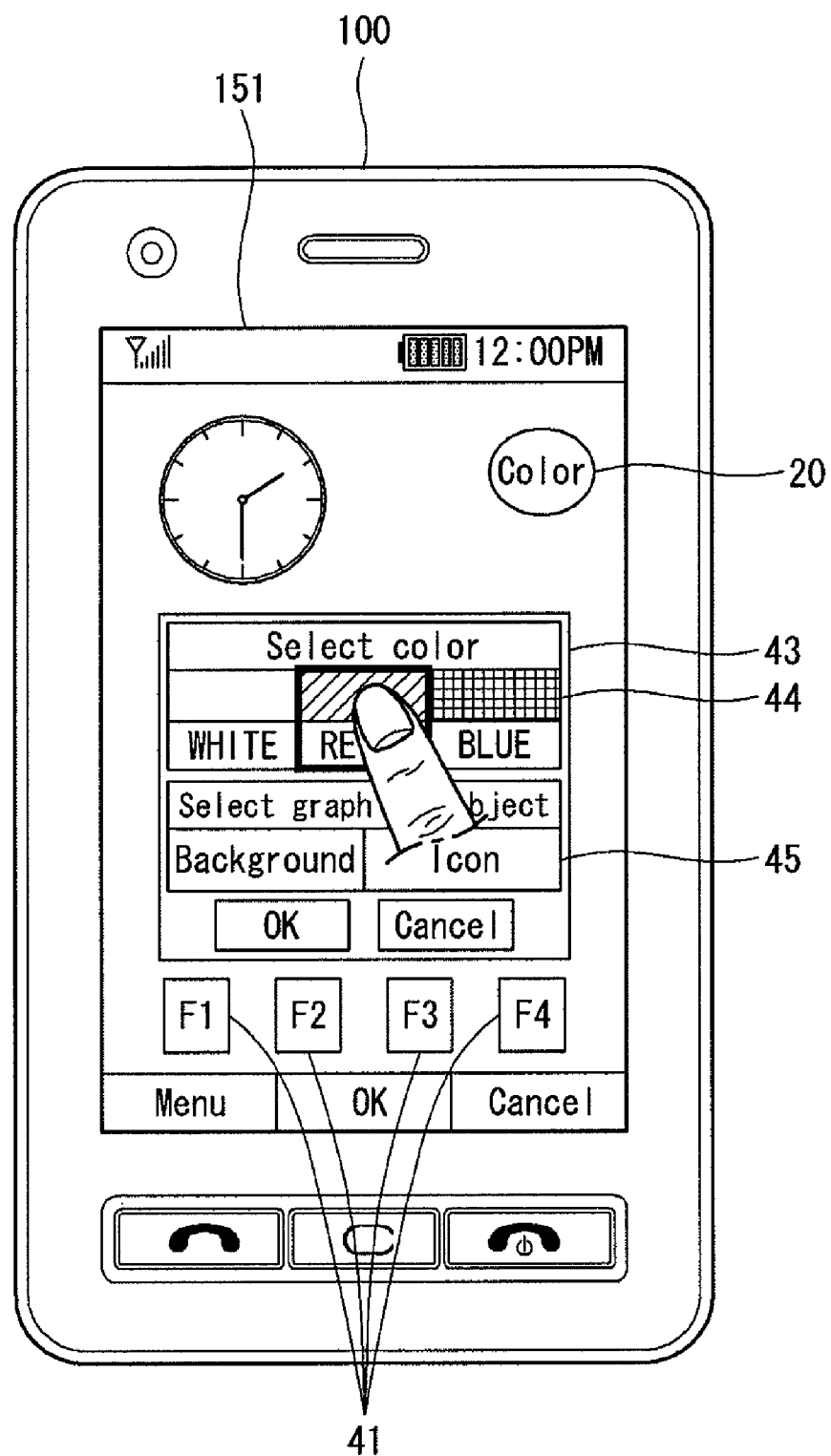

As illustrated in FIG. 12a, the user can select one or more of the plural pieces of color information provided to the color information region 44. In addition, as illustrated in FIG. 12b, the user can select one or more of the graphical objects provided to the graphical object selection region 45.

Figure 12B:
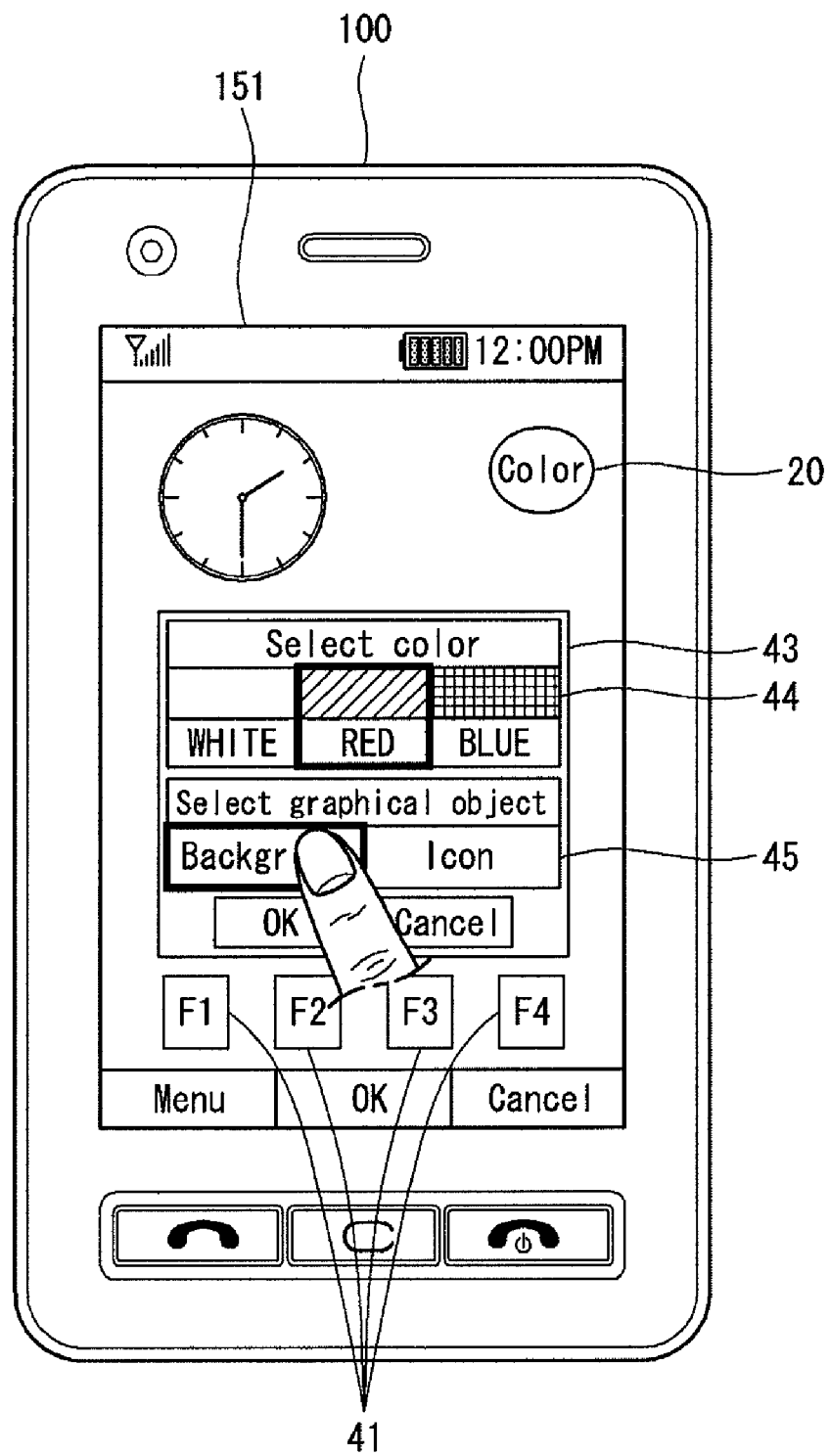

In FIGS. 12a and 12b, the user selects 'Red' and 'Background Image'. The controller 180 can change the background image 40 into 'Red' or change a current background image to a background image corresponding to 'Red' according to the user's selection.

Although the controller 180 provides the colors corresponding to the color information acquired through the color sensor 141 in FIGS. 11, 12a and 12b, the technical ideas of the present invention are not limited thereto. For example, as described above, the controller 180 may provide at least one of the color corresponding to the sensed color and the color contrasted with the sensed color.

Figure 13:
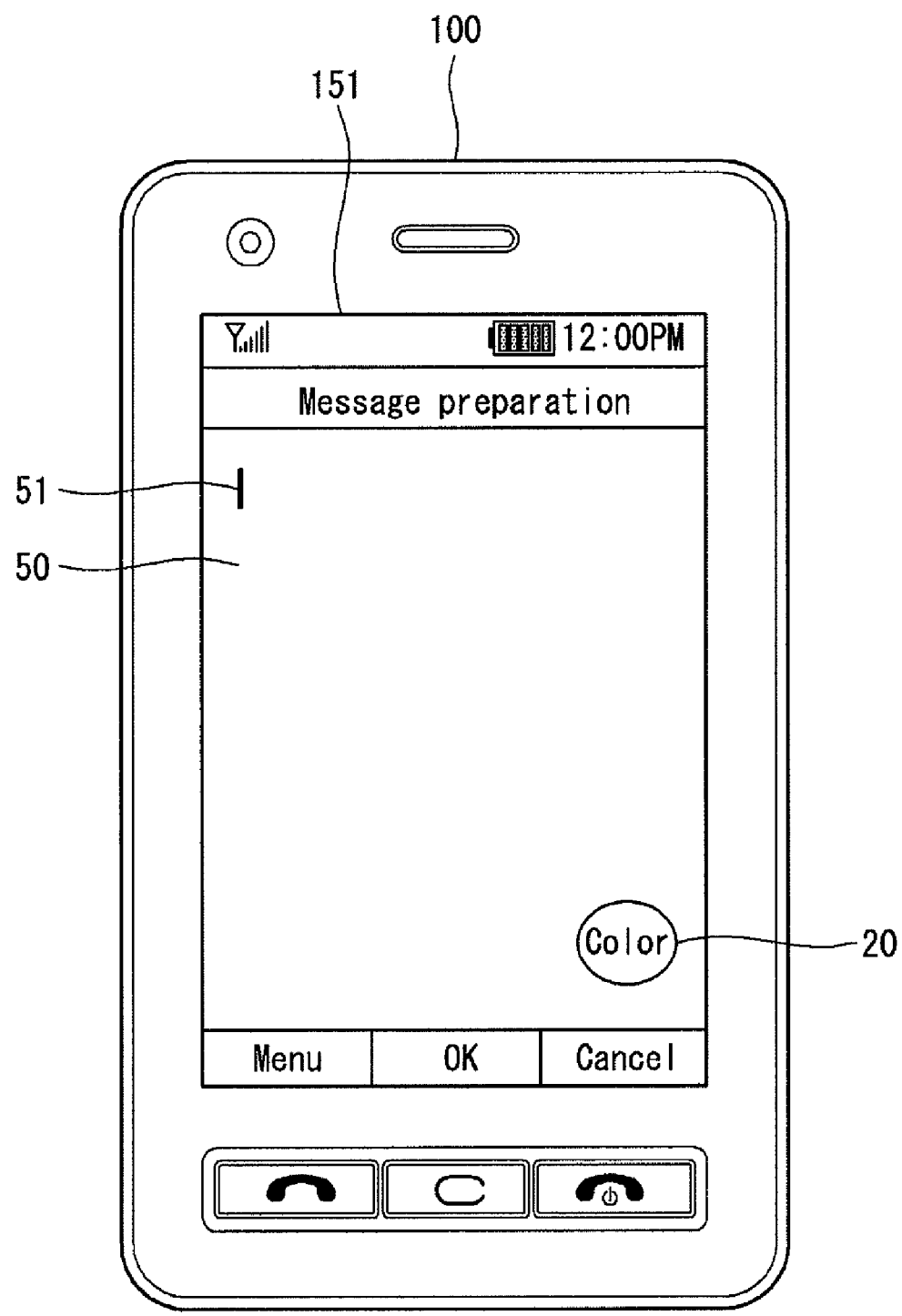

FIG. 13 illustrates an example in which an application that manages a message is activated. Particularly, FIG. 13 shows an example in which an image for preparing a message is activated among various functions provided by the message management application. Reference numeral 50 denotes a background image of the message preparation image, and 51 denotes a cursor.

The controller 180 can change the background image of the message preparation image in the same way as the example explained with reference to FIGS. 10 to 12b. That is, the controller 180 can change the background image of the message preparation image to reflect the color information acquired through the color sensor 141. For example, the controller 180 may change the background image into another image or change a color of the background image.

Figure 14:
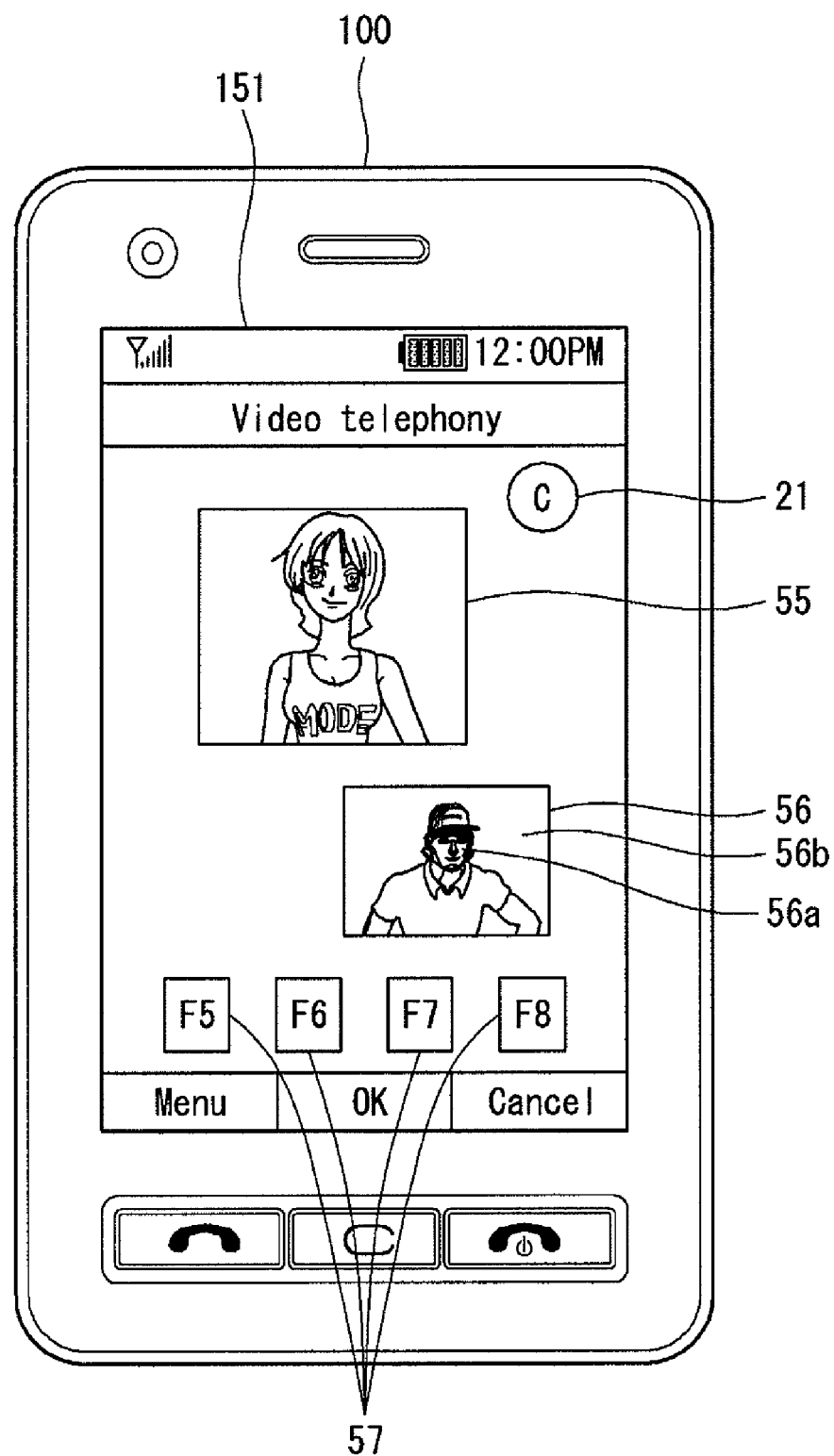

FIG. 14 illustrates an example in which a video telephony application is activated. Graphical objects provided by the video telephony application may include a first image region 55 that displays an image of a receiving part, a second image region 56 that displays the user's image, and function icons 57 that are allocated with various functions required of the video telephony, respectively.

In FIG. 14, reference numeral 21 denotes an indicator indicating that the color sensor 141 is currently being driven.

The image provided to the second image region 56 may be an image acquired through the camera 121. The image provided to the second image region 56 may be divided into the user's image 56*a* and a background image 56*b*. The image provided to the second image region 56 can be transmitted to the current receiving part performing the video telephony.

The controller 180 can drive the color sensor 141 to acquire peripheral color information. The controller 180 compares the acquired peripheral color information with the user's image 56*a*. When both colors are similar, the controller 180 can correct the color of the background image 56*b*.

When the acquired peripheral color information is similar to the user's image 56*a*, because the user's image 56*a* and the background image 56*b* are of similar colors, the receiving part cannot identify user's face well.

Accordingly, in this case, the controller 180 can correct the color of the background image 56*b* so that the background image 56*b* can reflect a color contrasted with the acquired peripheral color information. After the correction, the call receiving part can clearly identify the user's image 56*a*.

Figure 15A:
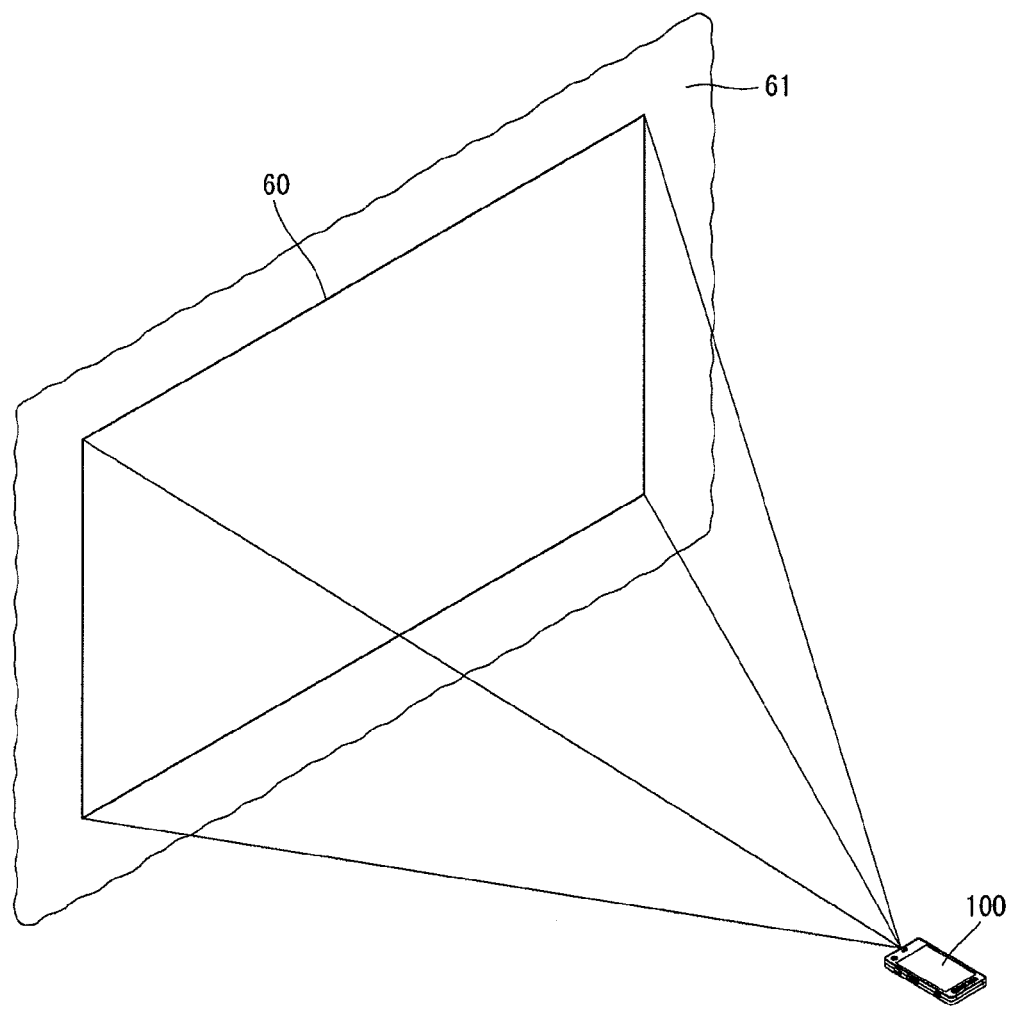
Figure 15B:
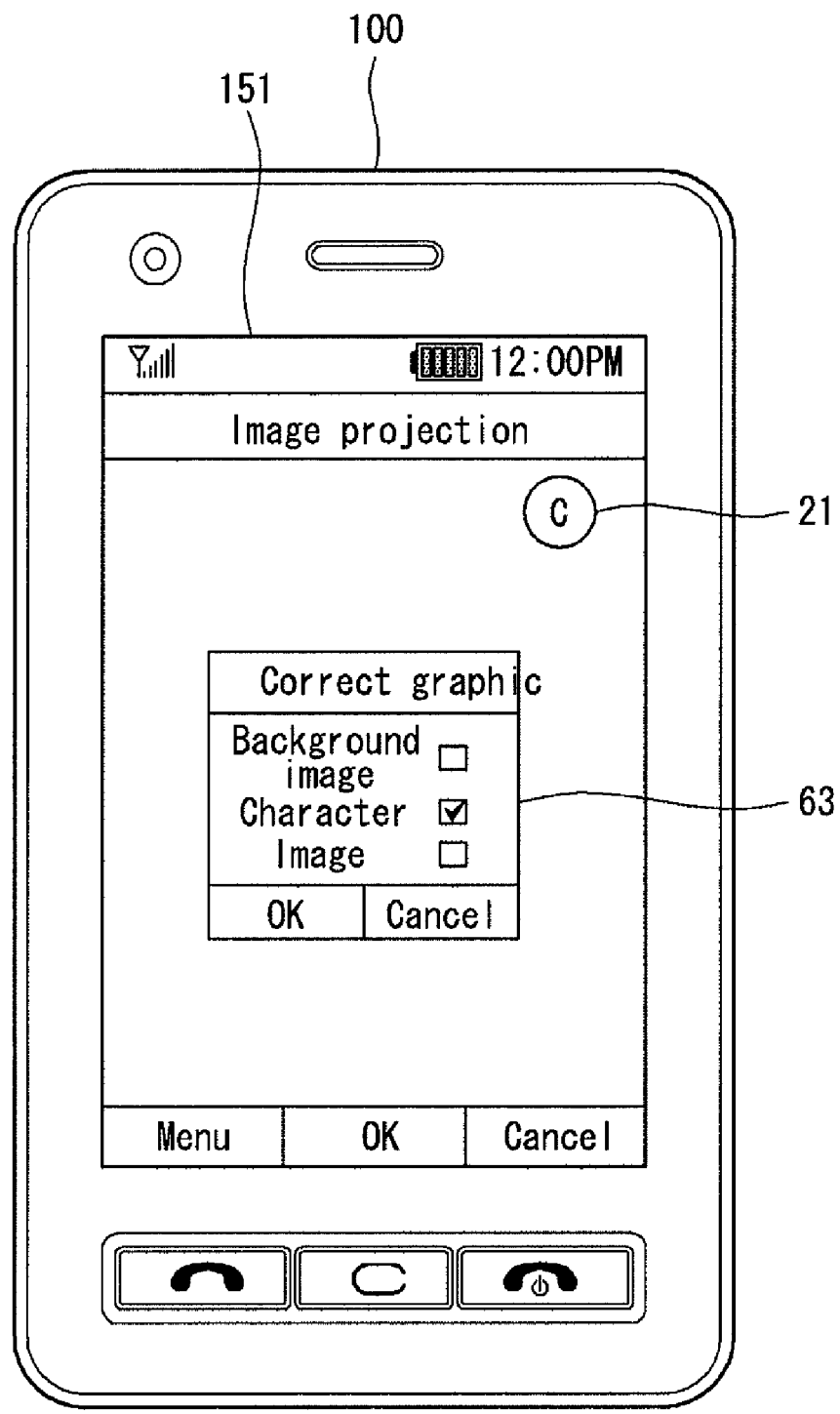

FIGS. 15*a* and 15*b* show a case where an application that manages an image projection function is activated. The mobile terminal 100 includes an image projection module to project an image to the outside. The image projection function is generally called beam projection.

FIG. 15*a* shows a state where the controller 180 drives the image projection module to project an enlarged image 60 on an external wall surface or a screen 61.

The controller 180 can drive the color sensor 141 to sense color information of the wall surface or the screen 61. For example, the user may bring the mobile terminal 100 close to the wall surface or the screen 61 so that the wall surface or the screen 61 can be located within a color sensing distance of the color sensor 141.

As illustrated in FIG. 15*b*, after the color information of the wall surface or the screen 61 is sensed, the controller 180 can provide the display unit 151 with a selection window 63 so that the user can select one or more of graphical objects forming the enlarged image 60.

Here, the controller 180 may be set to display the selection window 63 when at least one color of the graphical objects forming the enlarged image 60 corresponds to the sensed color information.

The user can select a specific graphical object through the selection window 63. The controller 180 can correct or change a color of the selected graphical object so that the color of the selected graphical object can be contrasted with the sensed color information.

For example, when a color of the wall surface or the screen 61 is 'White' and a color of the background image of the enlarged image 60 is also 'White', the controller 180 may provide the selection window 63. The user can select 'Background image' in the selection window 63 and change the color of the background image forming the enlarged image 60 into a color other than 'White'.

Meanwhile, the controller 180 can automatically change the graphical object of a similar color to the sensed color information among the graphical objects forming the enlarged image 60 according to the sensed color information.

For example, when the color of the wall surface or the screen 61 is 'Black' and a color of characters contained in the enlarged image 60 is also 'Black', the controller 180 may automatically change the color of the characters into another color (e.g., 'White') and project the enlarged image 60 without providing the selection window 63.

Figure 16A:
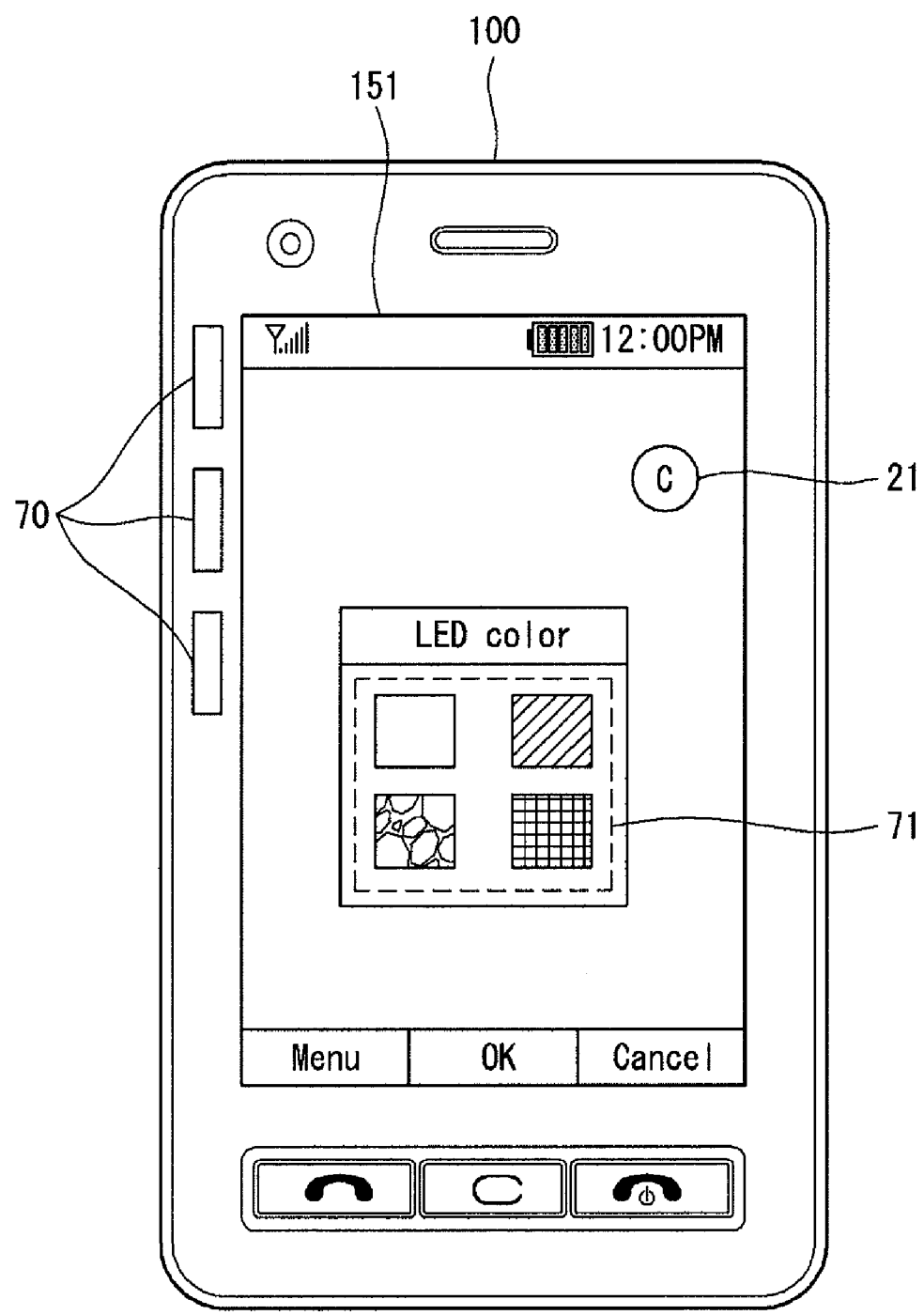
Figure 16B:
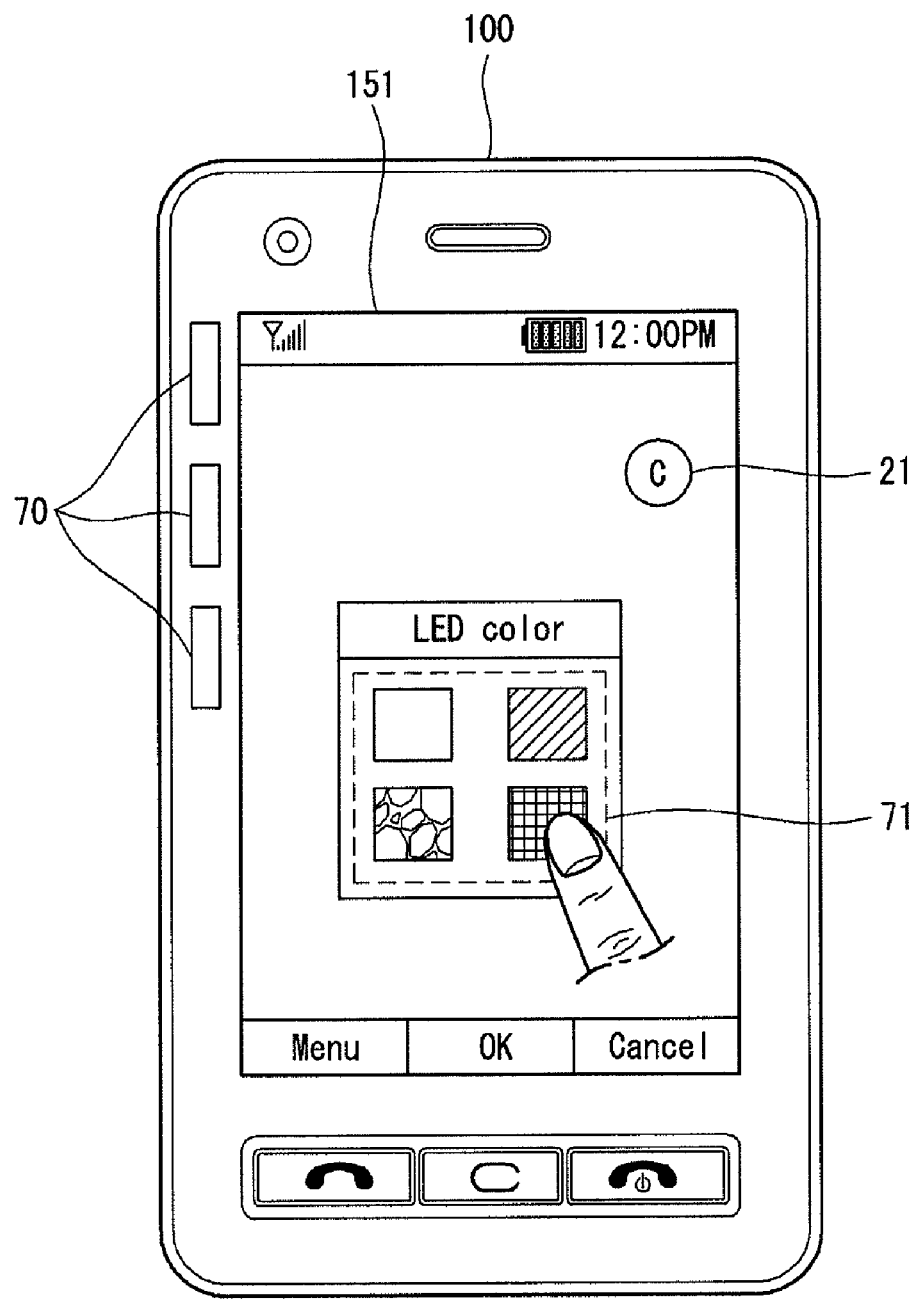

FIGS. 16*a* and 16*b* show a case where the mobile terminal 100 is provided with light emission means 70 such as LED.

When an application that controls the light emission means 70 is activated, as illustrated in FIG. 16*a*, the controller 180 can provide plural pieces of color information 71 acquired through the color sensor 141. As illustrated in FIG. 16*b*, the user can select a specific color from the plural pieces of color information 71.

The controller 180 can control the light emission means 70 to emit light of the specific selected color.

Although the plural pieces of color information 71 are provided in FIGS. 16*a* and 16*b* for convenience of explanation, the technical ideas of the present invention are not limited thereto.

For example, the controller 180 may use a color corresponding to color information provided in real time from the color sensor 141 so as to control the light emission means 70.

In addition, the controller 180 may provide a selection window that enables the user to select colors contrasted with the sensed pieces of color information, or may automatically use the colors contrasted with the sensed pieces of color information to control the light emission means 70.

Moreover, the controller 180 may periodically drive the color sensor 141 at intervals of a certain time, and use acquired color information to control the light emission means 70 whenever the color sensor 141 is driven.

Figure 17:
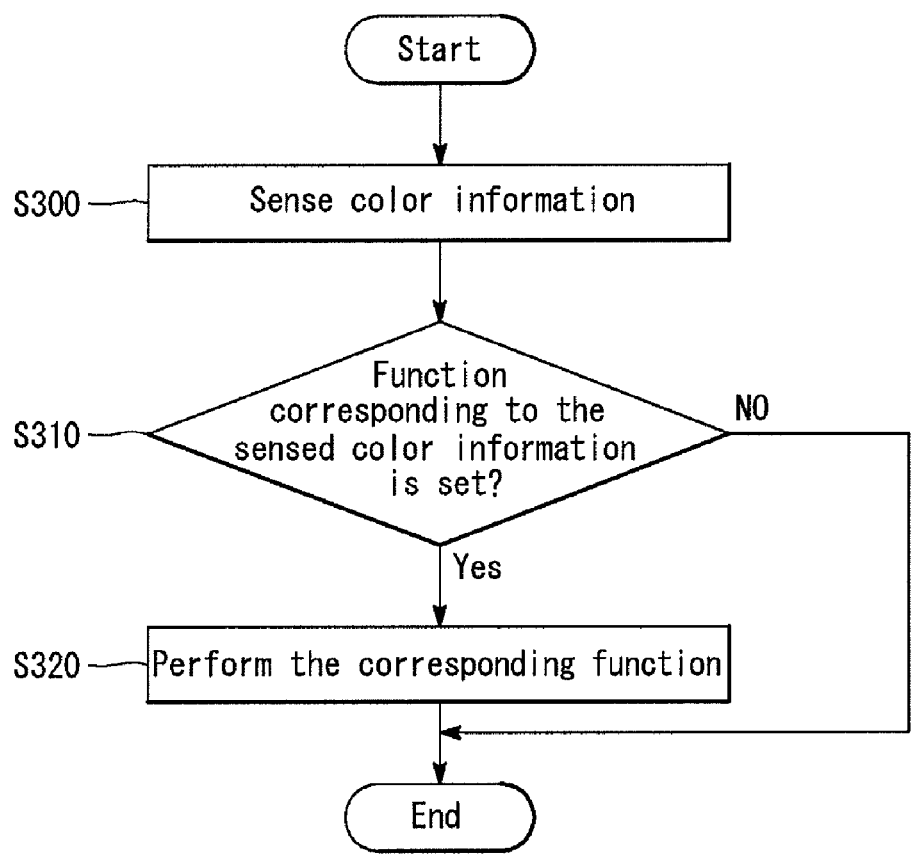
FIG. 17 is a flowchart of a method of performing functions using a mobile terminal according to a third embodiment of the present invention.
Figure 18:
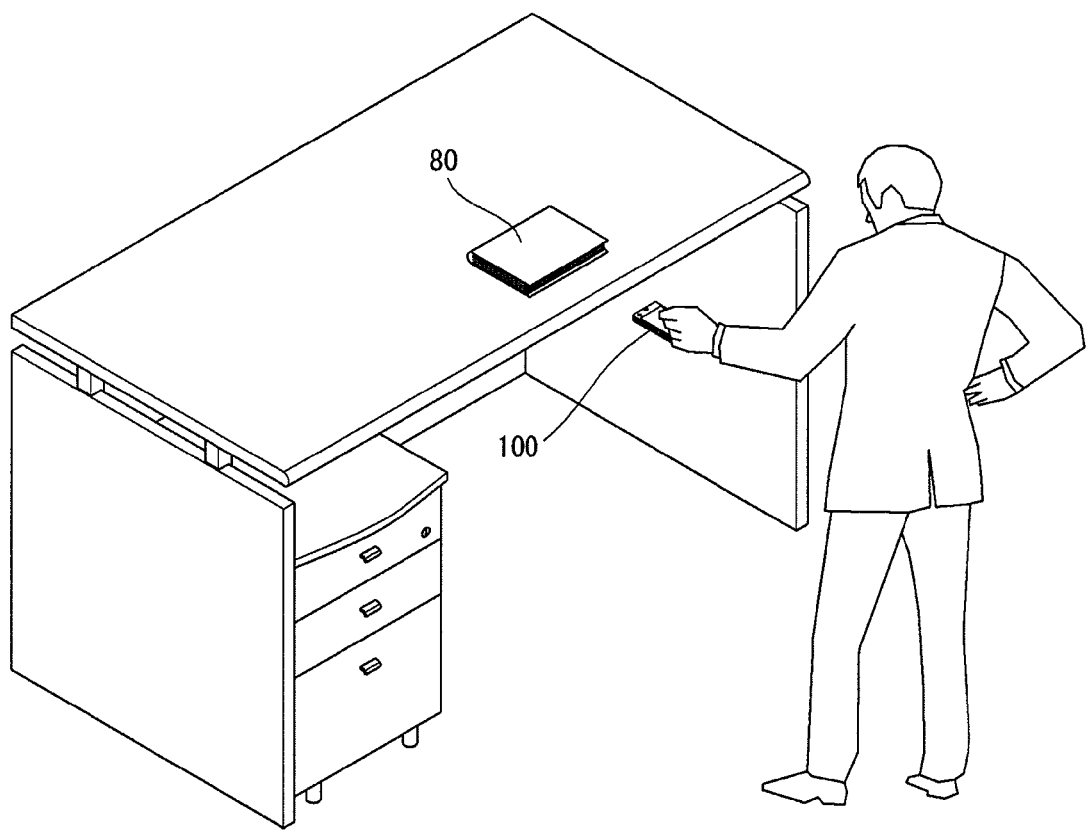

FIG. 17 is a flowchart of a method of performing functions using a mobile terminal according to a third embodiment of the present invention, and FIGS. 18 to 20 are diagrams used to explain the method of performing the functions using the mobile terminal according to the third embodiment of the present invention.

The method of performing the functions using the mobile terminal according to the third embodiment of the present invention can be implemented in the mobile terminal 100 explained with reference to FIG. 1, or another appropriately configured terminal. Hereinafter, the method of performing the functions using the mobile terminal according to the third embodiment of the present invention and operations of the mobile terminal 100 for implementing the same will be explained in detail below with reference to necessary drawings.

The controller 180 senses color information using the color sensor 141 (step S300).

The controller 180 judges whether a specific function corresponds to the sensed color information (step S310).

As a judgment result of step S310, when the specific function corresponds to the sensed color information, the controller 180 performs the corresponding function (step S320).

While the color sensor 141 is driven, the user brings the mobile terminal 100 close to an object of a specific color, to thereby perform the function corresponding to the specific color. Therefore, the user can perform the specific function without entering a special menu or manipulating the user input unit 130.

FIG. 18 is a conceptual diagram illustrating a case where the user brings the mobile terminal 100 close to a book 80 of a specific color so that the color sensor 141 can sense the specific color of the book 80.

FIG. 19 illustrates an example of a table in which specific functions match with specific colors.

Referring to FIG. 19, for example, when receiving color information corresponding to 'Red' 81 from the color sensor 141, the controller 180 can drive a web browser.

In addition, for example, when receiving color information corresponding to 'Black' 82 from the color sensor 141, the controller 180 can set the mobile terminal 100 to be in a lock mode.

Moreover, for example, when receiving color information corresponding to 'White' 83 from the color sensor 141, the controller 180 can release the mobile terminal 100 from the lock mode.

Furthermore, for example, when receiving color information corresponding to 'Blue' 84 from the color sensor 141, the controller 180 can perform a function of entering a phonebook.

FIG. 20 shows a table in which specific colors 85, 86, 87 and 88 match with contact numbers recorded or stored in the phonebook. According to the table of FIG. 20, color information can serve as a short key.

Referring to FIG. 20, for example, when receiving color information corresponding to 'Green' 85 from the color sensor 141, the controller 180 can send a call to 'James'. The phonebook stores a telephone number corresponding to 'James'.

In addition, for example, in a state where the color sensor 141 is driven and the functions according to the third embodiment of the present invention are activated, when the user brings the mobile terminal 100 close to an object of a color corresponding to 'Black', the controller 180 sends a call to 'Kevin'.

Moreover, for example, when successively receiving 'White' and 'Black' from the color sensor 141 within a predetermined time, the controller 180 can send a call, designating '010-1111-2222' as a receiving part.

The matching tables shown in FIGS. 19 and 20 may be set or changed by the user. The controller 180 can provide a user interface for the setting or changing.

Although the methods of sensing the color using the color sensor 141 and using the sensed color have been explained in the foregoing embodiments, the technical ideas disclosed in this description are not limited thereto.

For example, an ambient light quantity may be measured using the color sensor 141, and used in the same manner as the foregoing embodiments. One representative example thereof is to adjust brightness of the graphical object provided to the display unit 151 or the enlarged image 60 projected to the outside by the image projection function.

The method of performing the functions using the mobile terminal according to the present invention can be recorded on a computer-readable recording medium (e.g., compact disk, flash memory, etc.) as a program to be executed in the computer.

The method of performing the functions using the mobile terminal according to the present invention can be executed through software. When they are executed through software, the components of the present invention are code segments that perform required tasks. The programs or code segments can be stored in a processor-readable medium or transmitted via a computer data signal combined with a carrier wave in a transmission medium or a communication network.

The computer-readable recording medium includes all types of recording devices storing data readable by a computer system. Exemplary computer-readable recording media include ROM, RAM, CD-ROM, DVD±ROM, DVD-RAM, magnetic tapes, floppy disks, hard disks, and optical data storage devices. In addition, the computer-readable recording medium may be distributed among network-coupled computer systems to store and execute the computer-readable codes in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A mobile terminal, comprising:
a communication unit configured to access the Internet;
a color sensor configured to sense one or more colors of an external object; and
a controller configured to
transmit color information corresponding to the one or more colors sensed by the color sensor to a website as a search parameter via the communication unit, and
receive and output a search result searched based on the color information corresponding to the sensed one or more colors by the website.

2. The mobile terminal as claimed in claim 1, wherein the controller is further configured to receive a user input of a search word as a second search parameter.

3. The mobile terminal as claimed in claim 2, further comprising:
a display unit,
wherein the controller is further configured to provide the display unit with the color information for display, enable a user to select one or more of the sensed one or more colors via the display unit, and transmit corresponding selected color information as the search parameter.

4. The mobile terminal as claimed in claim 2, further comprising:
a touch screen,
wherein the controller is further configured to provide the touch screen with the color information for display, provide the touch screen with a webpage of the website, a sensed color selection region and a search term input region, and transmit the color information to the website in response to a user's touch and/or drag operation.

5. The mobile terminal as claimed in claim 2, wherein the controller is configured to automatically transmit the color information after receiving the input of the search word.

6. A method of performing functions using a mobile terminal, comprising:
accessing a website that provides a search function;
sensing a color of an external object using a color sensor;
transmitting color information corresponding to the sensed color to the website as a search parameter;
receiving a search result searched based on the color information corresponding to the sensed one or more colors by the search function of the website; and
outputting the search result.

7. The method as claimed in claim 6, further comprising:
receiving an input of a search word,
wherein the step of transmitting the color information includes automatically transmitting the search word to the website with the color information after receiving the input of the search word.

8. The method as claimed in claim 6, further comprising:
receiving a corresponding search result from the website; and
outputting the received search result.

* * * * *